US012510789B2

(12) United States Patent
Feng et al.

(10) Patent No.: US 12,510,789 B2
(45) Date of Patent: *Dec. 30, 2025

(54) DISPLAY SUBSTRATE, MANUFACTURING METHOD THEREOF AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Dawei Feng, Beijing (CN); Xiaojuan Wu, Beijing (CN); Yu Zhao, Beijing (CN); Zhiqiang Yu, Beijing (CN); Feng Liu, Beijing (CN); Yao Bi, Beijing (CN); Jinshuai Duan, Beijing (CN); Jiaxing Wang, Beijing (CN); Cuiyu Chen, Beijing (CN); Chunnan Feng, Beijing (CN); Biqi Li, Beijing (CN); Jian Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/281,709

(22) PCT Filed: Aug. 26, 2022

(86) PCT No.: PCT/CN2022/115124
§ 371 (c)(1),
(2) Date: Sep. 12, 2023

(87) PCT Pub. No.: WO2024/040574
PCT Pub. Date: Feb. 29, 2024

(65) Prior Publication Data
US 2025/0028211 A1 Jan. 23, 2025

(51) Int. Cl.
G02F 1/1362 (2006.01)
G02F 1/1333 (2006.01)
(Continued)

(52) U.S. Cl.
CPC .. *G02F 1/136286* (2013.01); *G02F 1/133357* (2021.01); *G02F 1/13338* (2013.01);
(Continued)

(58) Field of Classification Search
CPC .......... G02F 1/136286; G02F 1/13338; G02F 1/13472
See application file for complete search history.

(56) References Cited

U.S. PATENT DOCUMENTS 9,178,572 B1   11/2015  Zhang
9,733,781 B2    8/2017  Lu et al.
(Continued)

FOREIGN PATENT DOCUMENTS

CN   101930133 A   12/2010
CN   105159520 A   12/2015
(Continued)

OTHER PUBLICATIONS

International Search Report in PCT/CN2022/115124 in Chinese dated Apr. 27, 2023.
(Continued)

Primary Examiner — Paisley L Wilson
(74) Attorney, Agent, or Firm — Collard & Roe, P.C.

(57) ABSTRACT

A display substrate, a manufacturing method thereof and a display device. The display substrate includes a base substrate, a pixel driving circuit layer and an antenna layer, wherein the pixel driving circuit layer is arranged on the base substrate and includes a thin film transistor and a plurality of signal lines, and the antenna layer is arranged on a side of the pixel driving circuit layer far away from the
(Continued)

pixel driving circuit layer and comprises a first antenna arranging region including a first antenna network formed by a plurality of first antenna lines; wherein in a direction perpendicular to the display substrate, at least a portion of the first antenna lines overlap with at least a portion of the signal lines.

18 Claims, 13 Drawing Sheets

(51) Int. Cl.
    *G02F 1/1343* (2006.01)
    *G02F 1/1368* (2006.01)
    *G06F 3/041* (2006.01)
    *H01Q 1/22* (2006.01)
    *G02F 1/1335* (2006.01)
    *G06F 3/044* (2006.01)

(52) U.S. Cl.
    CPC .. *G02F 1/134363* (2013.01); *G02F 1/136227* (2013.01); *G02F 1/1368* (2013.01); *G06F 3/0412* (2013.01); *G06F 3/04164* (2019.05); *H01Q 1/22* (2013.01); *G02F 1/133512* (2013.01); *G06F 3/044* (2013.01)

(56) References Cited

U.S. PATENT DOCUMENTS

| | | | |
|---|---|---|---|
| 2012/0086661 A1 | 4/2012 | Shi et al. | |
| 2017/0047361 A1 | 2/2017 | Xu et al. | |
| 2017/0115784 A1 | 4/2017 | Li et al. | |
| 2019/0250470 A1 | 8/2019 | Huang et al. | |
| 2020/0185964 A1* | 6/2020 | Ren | G02F 1/133512 |
| 2020/0209995 A1 | 7/2020 | So et al. | |
| 2021/0336190 A1 | 10/2021 | Tan et al. | |
| 2022/0209068 A1 | 6/2022 | So | |
| 2023/0157093 A1 | 5/2023 | Ye | |
| 2023/0253697 A1 | 8/2023 | Wang et al. | |

FOREIGN PATENT DOCUMENTS

| | | |
|---|---|---|
| CN | 106098702 A | 11/2016 |
| CN | 104123041 B | 6/2017 |
| CN | 108182010 A | 6/2018 |
| CN | 108594513 A | 9/2018 |
| CN | 110867523 A | 3/2020 |
| CN | 111323953 A | 6/2020 |
| CN | 111381712 A | 7/2020 |
| CN | 111413815 A | 7/2020 |
| CN | 111427208 A | 7/2020 |
| CN | 111430372 A | 7/2020 |
| CN | 111430443 A | 7/2020 |
| CN | 112331708 A | 2/2021 |
| CN | 112462560 A | 3/2021 |
| CN | 113672119 A | 11/2021 |
| CN | 113917744 A | 1/2022 |
| CN | 114460780 A | 5/2022 |
| CN | 114695436 A | 7/2022 |
| WO | 2022089029 A1 | 5/2022 |

OTHER PUBLICATIONS

Written Opinion of the International Searching Authority in PCT/CN2022/115124 in Chinese dated Apr. 27, 2023.

* cited by examiner

1032C/1033C

DISPLAY SUBSTRATE, MANUFACTURING METHOD THEREOF AND DISPLAY DEVICE

CROSS REFERENCE TO RELATED APPLICATIONS

This application is the National Stage of PCT/CN2022/115124 filed on Aug. 26, 2022, the disclosure of which is incorporated by reference herein in its entirety.

TECHNICAL FIELD

The embodiment of the present disclosure relates to a display substrate, a manufacturing method thereof and a display device.

BACKGROUND

In recent years, Near Field Communication (NFC) technology is a new technology, devices using NFC technology can exchange data by using contactless radio frequency identification (RFID) and interconnection technology when they are close to each other, and it is widely used in the fields of access control, public transportation, mobile payment and anti-counterfeiting.

SUMMARY

At least one embodiment of the present disclosure provides a display substrate, the display substrate comprises a base substrate, a pixel driving circuit layer and an antenna layer; the pixel driving circuit layer is arranged on the base substrate, comprises a thin film transistor and a plurality of signal lines; the antenna layer is arranged on a side of the pixel driving circuit layer far away from the base substrate, and the antenna layer comprises a first antenna arranging region, the first antenna arranging region comprises a first antenna network formed by a plurality of first antenna lines; and in a direction perpendicular to the display substrate, at least a portion of the plurality of first antenna lines overlap with at least portion of the plurality of signal lines.

For example, in the display substrate provided by at least one embodiment of the present disclosure, the thin film transistor comprises a gate electrode, a first source-drain electrode and a second source-drain electrode, the plurality of signal lines include a first signal line electrically connected with the first source-drain electrode and extending substantially in a first direction, and the plurality of first antenna lines include a first sub-line extending substantially in the first direction, and in a direction perpendicular to the base substrate, the first signal line and the first sub-line at least partially overlap with each other.

For example, in the display substrate provided by at least one embodiment of the present disclosure, a line width of the first sub-line is less than or equal to a line width of the first signal line.

For example, in the display substrate provided by at least one embodiment of the present disclosure, the pixel driving circuit layer further comprises a second signal line electrically connected to the gate electrode and extending substantially in a second direction, the plurality of first antenna lines comprise a second sub-line extending substantially in the second direction, the first sub-line is electrically connected with the second sub-line, to form the first antenna network.

For example, in the display substrate provided by at least one embodiment of the present disclosure, the second signal line and the second sub-line do not overlap in a direction perpendicular to the base substrate.

For example, in the display substrate provided by at least one embodiment of the present disclosure, the first sub-line includes an avoidance portion at a position of the thin film transistor, and the avoidance portion overlaps the second signal line in the direction perpendicular to the base substrate.

For example, in the display substrate provided by at least one embodiment of the present disclosure, the display substrate has a plurality of subpixels arranged in a plurality of rows and a plurality of columns in an array, the plurality of subpixels include a plurality of first subpixels overlapping with the first antenna arranging region in a direction perpendicular to the base substrate, an orthographic projection of each of the plurality of first subpixels on the base substrate overlaps with an orthographic projection of the plurality of first antenna lines on the base substrate.

For example, in the display substrate provided by at least one embodiment of the present disclosure, a thickness of each of the plurality of first antenna lines is 1.5-2.5 microns in a direction perpendicular to the base substrate.

For example, the display substrate provided by at least one embodiment of the present disclosure further comprises a spacer, the spacer is arranged on a side of the antenna layer far away from the base substrate, and in a direction perpendicular to the base substrate, the spacer overlaps with the thin film transistor, and the plurality of first antenna lines do not overlap with the spacer.

For example, in the display substrate provided by at least one embodiment of the present disclosure, an interval between an orthogonal projection of the spacer on the base substrate and the orthogonal projections of the plurality of first antenna lines on the base substrate is not less than 5 microns.

For example, the display substrate provided by at least one embodiment of the present disclosure further comprises a planarization layer, the planarization layer is arranged on a side of the antenna layer far away from the base substrate to planarize the antenna layer.

For example, the display substrate provided by at least one embodiment of the present disclosure further comprises a pixel electrode layer, the pixel electrode layer is arranged on a side of the planarization layer far away from the base substrate and comprises a pixel electrode, the planarization layer comprises a pixel through hole, and the pixel electrode is electrically connected with the second source-drain electrode of the thin film transistor at least through the pixel through hole.

For example, in the display substrate provided by at least one embodiment of the present disclosure, the interval between the orthogonal projection of the spacer on the base substrate and an orthogonal projection of the pixel through hole on the base substrate is not less than 3 microns.

For example, the display substrate provided by at least one embodiment of the present disclosure further comprises a common electrode layer, the common electrode layer is arranged on a side of the pixel electrode layer far away from the base substrate and insulated from the pixel electrode layer and includes a common electrode.

For example, in the display substrate provided by at least one embodiment of the present disclosure, the common electrode comprises a bending part, and in a direction perpendicular to the base substrate, the bending part at least partially overlaps with the second sub-line.

For example, in the display substrate provided by at least one embodiment of the present disclosure, the antenna layer further comprises a second antenna arranging region at least partially surrounded by the first antenna arranging region, the second antenna arranging region comprises a second antenna network, and the second antenna network comprises a plurality of second antenna lines insulated from the plurality of first antenna lines, and at least a portion of the plurality of second antenna lines are electrically connected with the common electrode.

For example, in the display substrate provided by at least one embodiment of the present disclosure, at least a portion of the plurality of second antenna lines comprises an electrical connection part configured to be electrically connected with the common electrode, a line width of the electrical connection part is larger than a line width of the second antenna lines located at both sides of the electrical connection part.

For example, in the display substrate provided by at least one embodiment of the present disclosure, the plurality of second antenna lines include a third sub-line extending in a first direction, and the third sub-line has a first break to insulate the line portions on both sides of the first break.

For example, in the display substrate provided by at least one embodiment of the present disclosure, the display substrate has a plurality of subpixels arranged in a plurality of rows and a plurality of columns, the plurality of subpixels include a plurality of second subpixels overlapping with the second antenna arranging region in a direction perpendicular to the base substrate, and each two rows of the second subpixels are correspondingly provided with one first break.

For example, in the display substrate provided by at least one embodiment of the present disclosure, the first break and the second signal line at least partially overlap in a direction perpendicular to the base substrate.

For example, in the display substrate provided by at least one embodiment of the present disclosure, the plurality of second antenna lines include a fourth sub-line extending in a second direction, and the fourth sub-line has a second break to insulate the line portions on both sides of the second break.

For example, in the display substrate provided by at least one embodiment of the present disclosure, every three or four second subpixels are correspondingly provided with one second break.

For example, in the display substrate provided by at least one embodiment of the present disclosure, the antenna layer further comprises a third antenna arranging region arranged at a side of the first antenna arranging region, the third antenna arranging region comprises a third antenna network, and the third antenna network comprises a plurality of third antenna lines insulated from the plurality of first antenna lines, and at least a portion of the plurality of third antenna lines are electrically connected with the common electrode.

For example, in the display substrate provided by at least one embodiment of the present disclosure, the display substrate has a display region and a peripheral region surrounding the display region, and the first antenna network is located at least in the display region.

For example, the display substrate provided by at least one embodiment of the present disclosure further comprises an antenna binding part, the antenna binding part is arranged in the peripheral region and located at a first side of the display region, and at least a portion of the plurality of first antenna lines are bound to the antenna binding part.

For example, in the display substrate provided by at least one embodiment of the present disclosure, the antenna binding part comprises a first binding portion and a second binding portion spaced from each other, and the first binding portion and the second binding portion respectively comprise a plurality of binding pins, a first end of a whole of the first antenna network formed by a plurality of first antenna lines is bound to a plurality of binding pins of the first binding portion, and a second end is bound to a plurality of binding pins of the second binding portion, and the whole of the first antenna network forms a coil in the first antenna arranging region.

For example, in the display substrate provided by at least one embodiment of the present disclosure, the plurality of binding pins are arranged in a same layer with the gate electrode and/or the first source-drain electrodes.

For example, in the display substrate provided by at least one embodiment of the present disclosure, the first end and the second end are electrically connected with a plurality of binding pins of the first binding portion and the second binding portion through a plurality of connection lines, respectively, the plurality of connection lines are arranged in a same layer with the common electrode.

For example, in the display substrate provided by at least one embodiment of the present disclosure, the first antenna arranging region is in a U-shape, and both ends of the U-shape respectively include the first end and the second end.

For example, in the display substrate provided by at least one embodiment of the present disclosure, the U-shape comprises a first U-shape and a second U-shape nested with each other, and the second U-shape surrounds the first U-shape, a plurality of first antenna lines located at an end of the first U-shape are electrically connected with a plurality of first antenna lines located at an end of the second U-shape.

For example, in the display substrate provided by at least one embodiment of the present disclosure, the U-shape includes a fold line part located between the first end and the second end.

For example, in the display substrate provided by at least one embodiment of the present disclosure, a number of the first subpixels and a number of the second subpixels in a Nth row of subpixels are different from a number of the first subpixels and a number of the second subpixels in a N+1th row of subpixels at a position of the fold line part, respectively, and N is a positive integer greater than or equal to 1, or an odd number greater than or equal to 1, or an even number equal to 1.

For example, in the display substrate provided by at least one embodiment of the present disclosure, the common electrode comprises a plurality of sub-electrodes, and a whole of each of the plurality of sub-electrodes is in a block shape, the display substrate further comprises a plurality of touch control lines, the plurality of touch control lines are respectively electrically connected with the plurality of sub-electrodes and configured to provide touch control signals to the plurality of sub-electrodes in a touch control stage.

For example, in the display substrate provided by at least one embodiment of the present disclosure, the plurality of touch control lines are further configured to provide display signals to the plurality of block-shaped sub-electrodes in a display stage.

For example, in the display substrate provided by at least one embodiment of the present disclosure, the plurality of touch control lines and the first signal line are arranged in a same layer with the first source-drain electrode.

For example, in the display substrate provided by at least one embodiment of the present disclosure, extending directions of the plurality of touch control lines are substantially a same with an extending direction of the first signal line.

For example, in the display substrate provided by at least one embodiment of the present disclosure, the plurality of touch control lines respectively comprise touch control connection parts configured to be electrically connected with the plurality of block-shaped sub-electrodes, and the plurality of first sub-lines are disconnected at a position of the touch control connection part.

At least one embodiment of the present disclosure provides a display device, the display device comprises the display substrate provided by an embodiment of the present disclosure, an opposite substrate and a liquid crystal layer, the opposite substrate is opposite to the display substrate; and the liquid crystal layer is located between the display substrate and the opposite substrate.

For example, in the display device provided by at least one embodiment of the present disclosure, the opposite substrate comprises a black matrix layer, the black matrix layer includes a plurality of subpixel openings, orthographic projections of the plurality of first antenna lines on the base substrate are located inside an orthographic projection of the black matrix layer on the base substrate.

At least one embodiment of the present disclosure provides a method of manufacturing a display substrate, comprising: providing a base substrate; forming a pixel driving circuit layer on the base substrate, wherein the pixel driving circuit layer comprises a thin film transistor and a plurality of signal lines; and forming an antenna layer on a side of the pixel driving circuit layer far away from the base substrate, wherein the antenna layer comprises a first antenna arranging region, and the first antenna arranging region comprises a first antenna network formed by a plurality of first antenna lines, and in a direction perpendicular to the display substrate, at least a portion of the plurality of first antenna lines overlap with at least a portion of the plurality of signal lines.

BRIEF DESCRIPTION OF THE DRAWINGS

In order to explain the technical scheme of the embodiments of the present disclosure more clearly, the attached drawings of the embodiments will be briefly introduced below. Obviously, the attached drawings in the following description only relate to some embodiments of the present disclosure, and are not limited to the present disclosure.

DETAILED DESCRIPTION

Figure 1:
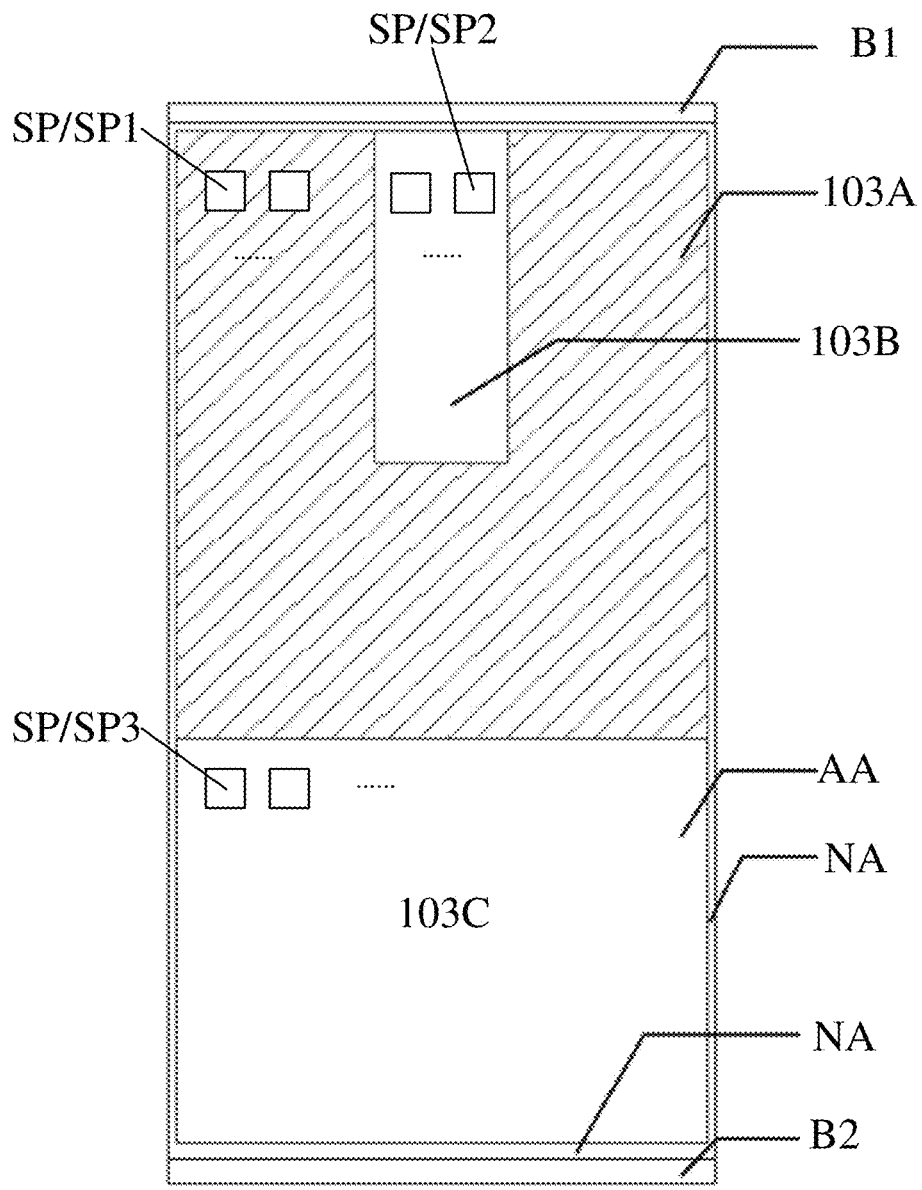
FIG. 1 is a schematic plan view of a display substrate provided by at least one embodiment of the present disclosure.

In order to make the purpose, technical solution and advantages of the embodiments of the present disclosure more clear, the technical solution of the embodiments of the present disclosure will be described clearly and completely by connecting with the drawings of the present disclosure. Obviously, the described embodiments are a portion of the embodiments of the present disclosure, not all embodiments. Based on the described embodiments of the present disclosure, all other embodiments obtained by those ordinary skilled in the art without creative effort belong to the scope of protection of the present disclosure.

Unless otherwise defined, technical terms or scientific terms used in the present disclosure shall have their common meanings as understood by those ordinary skilled in the art. The terms "first". "second" and the like used in the present disclosure do not indicate any order, quantity or importance, but are only used to distinguish different components. Terms such as "including" or "containing" and the like mean that the elements or objects appearing before the words include the elements or objects listed after the words and their equivalents, without excluding other elements or objects. Terms such as "connected" or "connected" and the like are not limited to physical or mechanical connection, but may include electrical connection, whether direct or indirect. "Up", "Down", "Left" and "Right" are only used to indicate the relative positional relationship. When the absolute position of the described object changes, the relative positional relationship may also change accordingly.

In electronic devices using NFC technology, such as display devices, NFC antennas are usually manufactured on a printed circuit board (PCB) or a flexible printed circuit board (FPCB), and then combined with the display substrate of the display device to form a display device with NFC function. At this time, the NFC antenna and the display substrate are formed by independent manufacturing processes, respectively, which increases the manufacturing cost.

In some embodiments, the NFC antenna may be integrated in the display substrate, so that the NFC antenna may be formed during the manufacturing process of the display substrate. However, due to the complex structure of the display substrate itself, the formation and arrangement of NFC antenna need to fully consider the compatibility with the original process and structure of the display substrate, to avoid affecting the display function of the display substrate. Therefore, it is necessary to reasonably design the configuration of NFC antenna, to fully realize the function of NFC antenna without affecting the display effect of the display substrate.

At least one embodiment of the present disclosure provides a display substrate, a manufacturing method thereof, and a display device. The display substrate comprises a base substrate, a pixel driving circuit layer and an antenna layer, wherein the pixel driving circuit layer is arranged on the base substrate and comprises a thin film transistor and a plurality of signal lines: the antenna layer is arranged on a side of the pixel driving circuit layer far away from the base substrate and comprises a first antenna arranging region: the first antenna arranging region comprises a first antenna network formed by a plurality of first antenna lines; and in a direction perpendicular to the display substrate, at least a portion of the plurality of first antenna lines are overlapped with at least a portion of the plurality of signal lines.

In the display substrate provided by the embodiment of the present disclosure, a first antenna network formed by a plurality of first antenna lines is arranged in the display substrate, so that it may be formed in the same process as the display substrate; Moreover, the first antenna network is arranged in a separate antenna layer, and its structure configuration is more flexible, so as to fully realize its near-field communication function. By overlapping at least a portion of the plurality of first antenna lines with at least a portion of the plurality of signal lines, it is helpful to improve the aperture ratio of the display substrate.

Next, the display substrate, the manufacturing method and the display device provided by the embodiment of the present disclosure will be introduced in detail through several specific embodiments.

Figure 2:
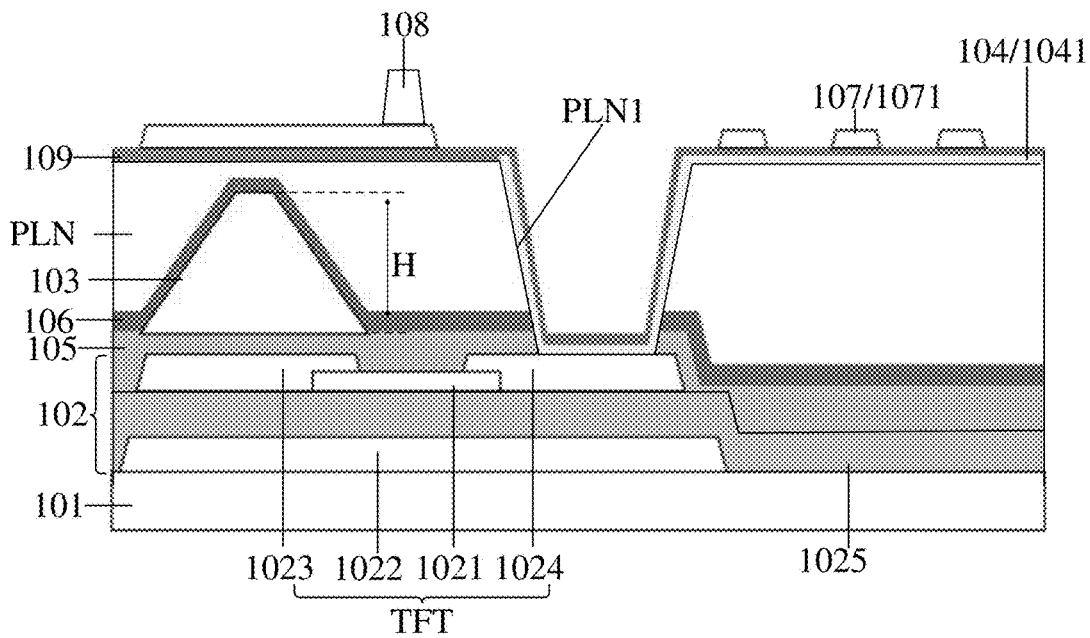
FIG. 2 is a schematic cross-sectional view of a display substrate provided by at least one embodiment of the present disclosure.
Figure 3:
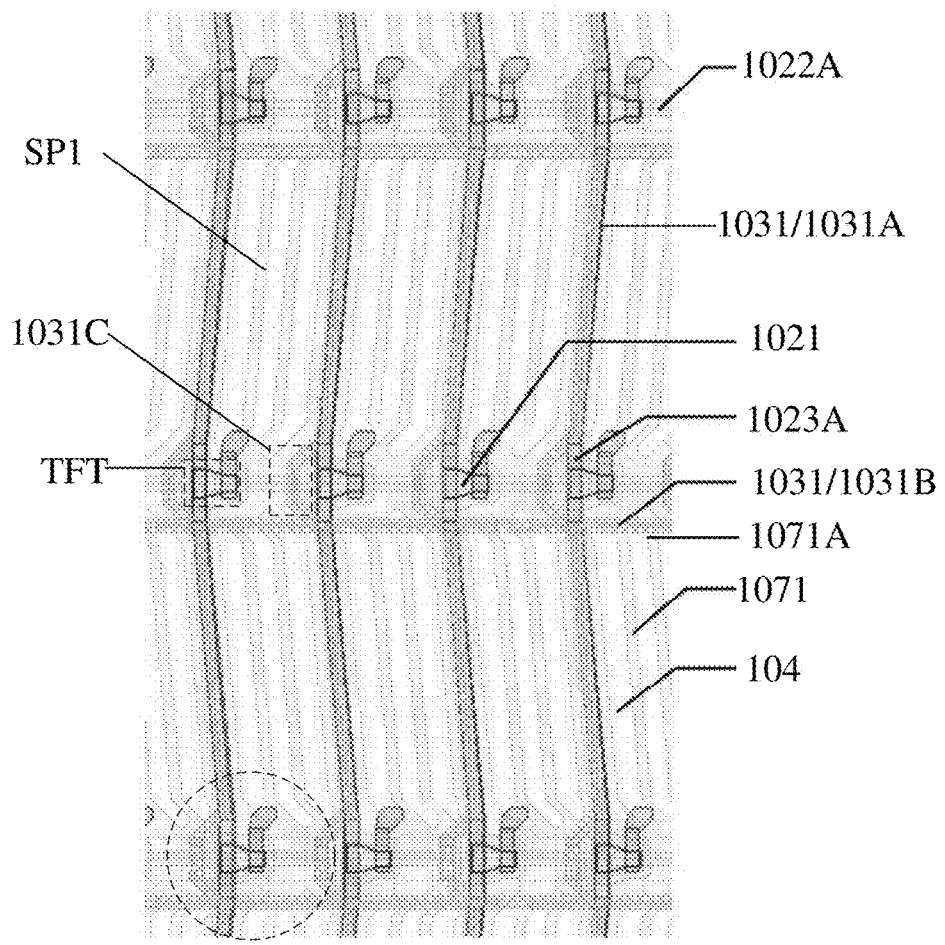
FIG. 3 is a circuit arrangement diagram of a display substrate provided by at least one embodiment of the present disclosure in a first antenna arranging region.

At least one embodiment of the present disclosure provides a display substrate, and FIG. 1 shows a schematic plan view of the display substrate, FIG. 2 shows a schematic cross-sectional view of the display substrate, and FIG. 3 shows a circuit layout diagram of the display substrate in a first antenna arranging region.

As shown in FIGS. 1-3, the display substrate includes a base substrate 101, a pixel driving circuit layer 102 and an antenna layer 103, wherein the pixel driving circuit layer 102 is arranged on the base substrate 101 and includes a thin film transistor TFT and a plurality of signal lines, and the antenna layer 103 is arranged on a side of the pixel driving circuit layer 102 far away from the base substrate 101 and includes a first antenna arranging region 103A. The first antenna arranging region 103A includes a first antenna network formed by a plurality of first antenna lines 1031, for example, configured to realize a near field communication function, that is, an NFC function, or other communication functions.

In a direction perpendicular to the display substrate, that is, in a vertical direction in FIG. 2, at least a portion of the plurality of first antenna lines 1031 overlap with at least a portion of the plurality of signal lines, so that at least a portion of the first antenna lines 1031 and at least a portion of the plurality of signal lines occupy basically the same space on the display substrate, which can reduce the non-display region on the display substrate and is beneficial to improving the aperture ratio of the display substrate.

For example, in some embodiments, as shown in FIGS. 2 and 3, the thin film transistor TFT includes an active layer 1021, a gate electrode 1022, a first source-drain electrode 1023 and a second source-drain electrode 1024, and a plurality of signal lines include a first signal line 1023A electrically connected with the first source-drain electrode 1023 and extending substantially along a first direction (e.g., a vertical direction in FIG. 3). The plurality of first antenna lines 1031 include first sub-line 1031A extending substantially in the first direction, and the first signal line 1023A at least partially overlap with the first sub-line 1031A in a direction perpendicular to the base substrate 101.

For example, in the embodiment of the present disclosure, the line substantially extends along a certain direction, which means that the overall extension trend of the line is along the certain direction, but each portion of the line does not strictly extend along the certain direction.

For example, in some embodiments, the first signal line 1023A and the first sub-line 1031A overlap substantially completely, or most of the first signal line 1023A overlaps with the first sub-line 1031A and only in a few positions, such as the arranging position of the thin film transistor TFT (for example, a position of the avoidance part 1031C described later), the first signal line 1023A and the first sub-line 1031A do not overlap with each other.

For example, in some embodiments, the first source-drain electrode 1023 is a source electrode of the thin film transistor TFT, and at this time, the first signal line 1023A may also be used as a source line.

For example, in some embodiments, a line width of the first sub-line 1031A is less than or equal to a line width of the first signal line 1023A, so that an orthographic projection of the first sub-line 1031A on the base substrate 101 is located within an orthographic projection of the first signal line 1023A on the base substrate 101 in a portion where the first sub-line 1031A and the first signal line 1023A overlap with each other, the first sub-line 1031A and the first signal line 1023A occupy basically the same space on the display substrate, which can reduce the non-display region on the display substrate and is beneficial to improving the aperture ratio of the display substrate.

It should be noted that in the embodiment of the present disclosure, the line width of a structure is a dimension of the structure in a direction perpendicular to its extension direction.

For example, in some embodiments, the plurality of signal lines further includes a second signal line 1022A electrically connected to the gate electrode 1022 and extending substantially along a second direction (e.g., a horizontal direction in FIG. 3), and the second signal line 1022A is, for example, a scanning signal line. The plurality of first antenna lines 1031 include second sub-lines 1031B extending substantially along the second direction, and the first sub-line 1031A is electrically connected with the second sub-line 1031B, to form a criss-cross grid-like first antenna network, as shown in FIG. 3.

For example, in some embodiments, as shown in FIG. 3, the second signal line 1022A extends substantially in parallel with the second sub-line 1031B, and the second signal line 1022A does not overlap with the second sub-line 1031B in a direction perpendicular to the base substrate 101, so as to avoid the electric signal transmitted on the second sub-line 1031B from affecting, for example, the scanning signal transmitted on the second signal line 1022A.

For example, in some embodiments, as shown in FIG. 3, the first sub-line 1031A extends in an arc shape at a position of the thin film transistor TFT, that is, it includes an avoidance portion 1031C, so that an extension of the first sub-line 1031A avoids the thin film transistor TFT to avoid the electric signal transmitted on the first sub-line 1031A from affecting the normal operation of the thin film transistor TFT. For example, in the direction perpendicular to the base substrate 101, the avoidance portion 1031C of the first sub-line 1031A overlaps with the second signal line 1022A, and the extension directions of the overlapping portions of the avoidance portion 1031C and the second signal line 1022A are perpendicular, so that the overlapping area of the two can be minimized.

For example, in some embodiments, as shown in FIG. 1, the display substrate has a plurality of subpixels SP of a matrix arrangement arrayed in a plurality of rows and a plurality of columns, the plurality of subpixels SP include a plurality of first subpixels SP1 overlapping with the first antenna arranging region 103A in the direction perpendicular to the base substrate 101, and an orthographic projection of each of the plurality of first subpixels SP1 overlaps with orthographic projections of a plurality of first antenna lines 1031 on the base substrate 101. That is, each first subpixel SP1 corresponding to the first antenna arranging region 103A is arranged to correspond to a portion of the first antenna line 1031, thereby increasing the arrangement density of the first antenna lines 1031, reducing the overall resistance of the first antenna network formed by a plurality of first antenna lines 1031, and further improving the performance of the antenna line.

For example, in some embodiments, as shown in FIG. 3, a plurality of first signal lines 1023A and a plurality of second signal lines 1022A define a plurality of first subpixels SP1, and each first subpixel SP1 overlaps a portion of the first sub-line 1031A and a portion of the second sub-line 1031B.

For example, in some embodiments, as shown in FIG. 2, in a direction perpendicular to the base substrate 101, a thickness H of the plurality of first antenna lines 1031 is 1.5 microns to 2.5 microns, such as 1.8 microns, 2.0 microns or 2.2 microns. Therefore, the first antenna line 1031 has a relatively thick thickness to reduce the resistance of the first antenna line 1031 and improve the antenna performance.

For example, in some embodiments, materials of the plurality of first antenna lines 1031 include metal materials such as copper or alloy materials, and copper has good conductivity and lower square resistance, which can further reduce the antenna resistance.

For example, in some embodiments, as shown in FIG. 2, the display substrate further includes a gate insulating layer 1025 and a first passivation layer 105, wherein the gate insulating layer 1025 is arranged on a side of the gate electrode 1022 far away from the base substrate 101, and the first passivation layer 105 is arranged on a side of the first source-drain electrode 1023 and the second source-drain electrode 1024 far away from the base substrate 101. At this time, the antenna layer 103 is arranged on a side of the first passivation layer 105 far away from the base substrate, and a buffering layer 106 is further arranged on a side of the antenna layer 103 far away from the base substrate 101, to protect the antenna layer 103.

For example, in some embodiments, as shown in FIG. 2, the display substrate further includes a spacer 108, which is arranged on a side of the antenna layer 103 far away from the base substrate 101. In the direction perpendicular to the base substrate 101, the spacer 108 overlaps with the thin film transistor TFT, and the plurality of first antenna lines 1031 do not overlap with the spacer 108. Because the first antenna lines 1031 have a certain thickness, and the spacer 108 also has a relatively large thickness, if the spacer 108 overlaps with a plurality of first antenna lines 1031, the display substrate will be too thick, and it is difficult to realize a thin design.

Figure 4:
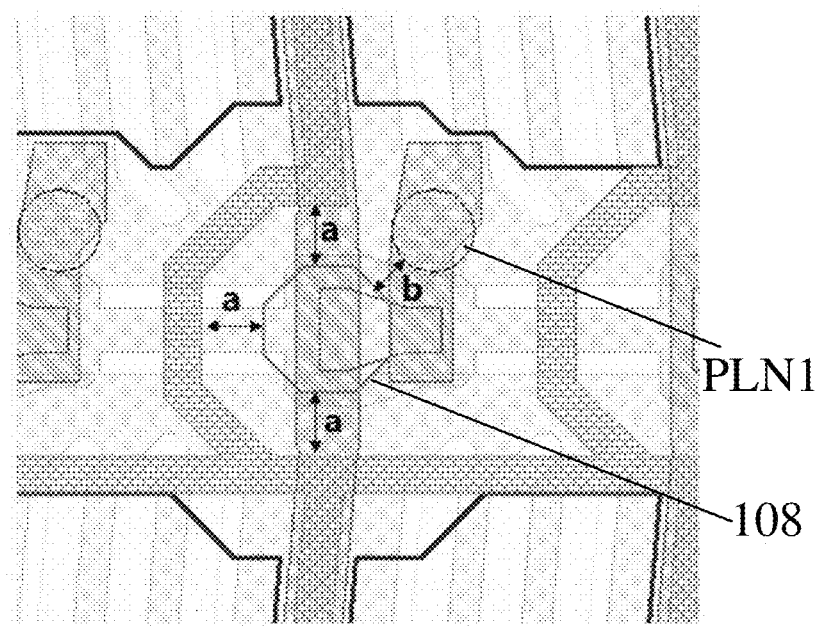
FIG. 4 is an enlarged schematic view of the display substrate in FIG. 3 in a dotted line portion.

For example, FIG. 4 shows an enlarged schematic view of the display substrate in FIG. 3 at a dotted line. As shown in FIG. 4, the avoidance portion 1031C of the first sub-line 1031A, that is, the arc-shaped extension part surrounds the spacer 108 and is separated from the spacer 108 by a certain distance.

For example, in some embodiments, as shown in FIG. 4, an interval a between an orthogonal projection of the spacer 108 on the base substrate 101 and an orthogonal projection of the plurality of first antenna lines 1031 on the base substrate 101 is not less than 5 microns, so as to avoid the spacer 108 from overlapping with the first sub-lines 1031A due to the process error. At this time, the orthographic projection of the plurality of first antenna lines 1031 on the base substrate 101 is also separated from the orthographic projection of the thin film transistor TFT on the base substrate 101 by a certain distance, so that which can avoid that the normal operation of the thin film transistor TFT is influenced by the electrical signals transmitted in the antenna lines.

For example, in some embodiments, as shown in FIG. 2, the display substrate further comprises a planarization layer PLN, and the planarization layer PLN is arranged on a side of the antenna layer 103 far away from the base substrate 101, for example, also on a side of the buffer layer 106 far away from the base substrate 101, so as to planarize the antenna layer 103. Because the antenna layer 103 has a relatively large thickness, if the planarization layer PLN is not provided, there will be a large step difference on a surface of the display substrate, which is not conducive to the arrangement of other structures. Moreover, when the display substrate is used in a liquid crystal display device, the step difference will lead to abnormal liquid crystal distortion, thus affecting the display effect.

For example, the planarization layer PLN usually uses organic materials such as polyimide and resin, and these organic materials have certain fluidity before curing, which can significantly improve the problem of step difference around antenna lines.

For example, in some embodiments, as shown in FIG. 2, the display substrate further includes a pixel electrode layer 104, which is arranged on a side of the planarization layer PLN far away from the base substrate 101 and includes a pixel electrode 1041, and the planarization layer PLN includes a pixel through hole PLN1, and the pixel electrode 1041 is electrically connected with the second source-drain electrode 1024 of the thin film transistor TFT at least through the pixel through hole PLN1.

For example, in some embodiments, as shown in FIG. 4, an interval between the orthographic projection of the spacer 108 on the base substrate 101 and an orthographic projection of the pixel through hole PLN1 on the base substrate 101 is not less than 3 microns. Thereby collapsing of the spacer 108 at the pixel through hole PLN1 is avoided, and further influence of the pixel through hole PLN1 on a height of the spacer 108 is avoided.

For example, in some embodiments, as shown in FIG. 2, the display substrate further includes a common electrode layer 107, which is arranged on a side of the pixel electrode layer 104 far away from the base substrate 101 and is insulated from the pixel electrode layer 104, for example, by a second passivation layer 109, and the common electrode layer 107 includes a common electrode 1071. For example, the spacer 108 is disposed on a side of the common electrode layer 107 away from the base substrate 101.

For example, in the driving process of the display substrate, the pixel electrode 1041 is configured to be applied with a high-level voltage, and the common electrode 1071 is configured to be applied with a low-level voltage. When the display substrate is used in a liquid crystal display device, the liquid crystal can be deflected in different degrees driven by the voltage difference formed between the pixel electrode 1041 and the common electrode 1071, thereby realizing display.

For example, in some embodiments, as shown in FIG. 3, the common electrode 1071 may be a strip electrode and extend substantially in the first direction. For example, the common electrode 1071 includes a bent part 1071A, for example, near the edge of each subpixel, and the bent part 1071A at least partially overlaps the second sub-line 1031B in the direction perpendicular to the base substrate 101. Since the bent part 1071A of the common electrode 1071 is usually located in the non-opening region of the display substrate, that is, the non-light emitting region, the second sub-line 1031B can be shielded by a black matrix layer (described in detail later) by arranging it at a position overlapping with the bent part 1071A, thereby preventing the second sub-line 1031B from affecting the aperture ratio of the display substrate.

Figure 5A:
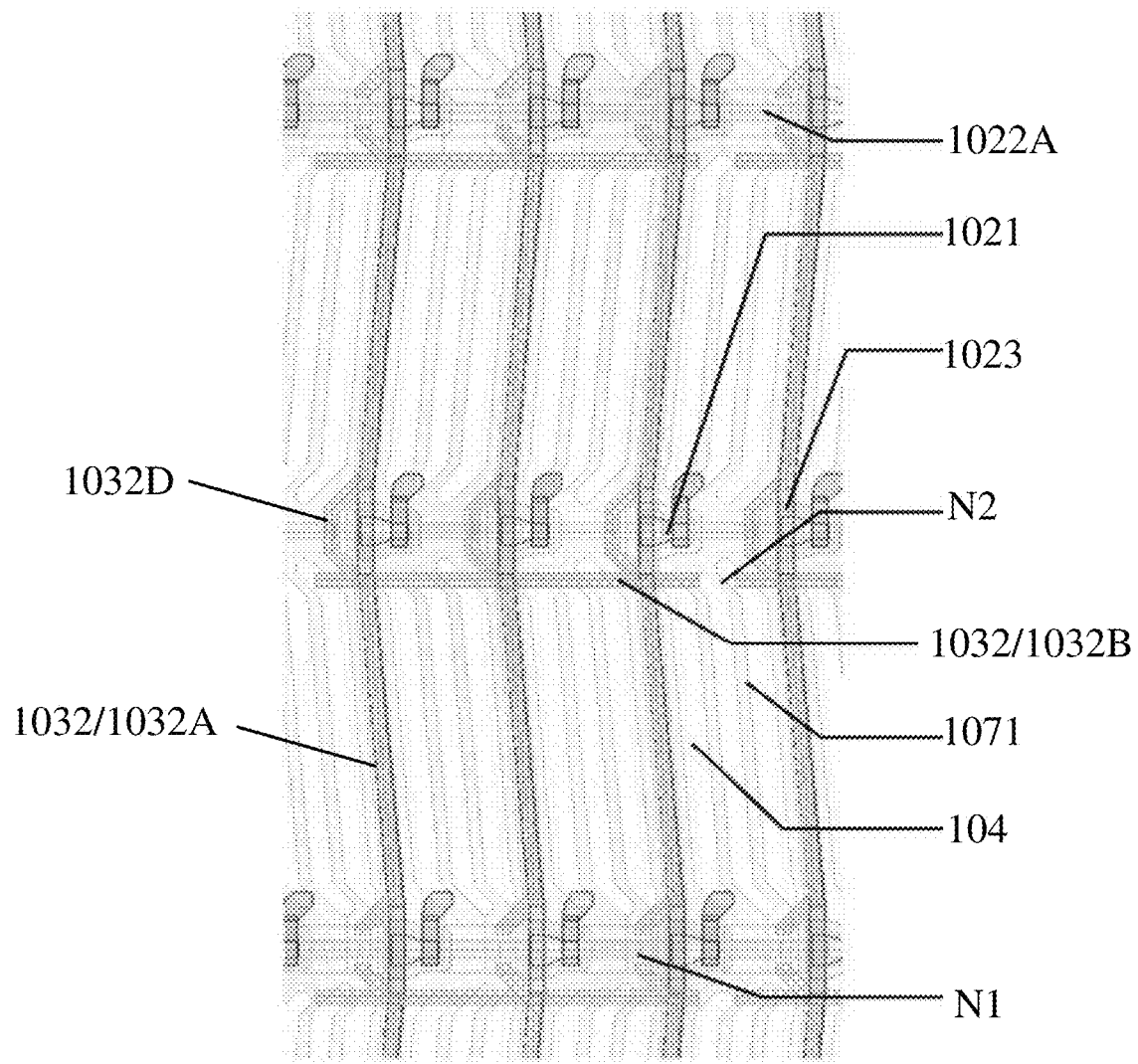
FIG. 5A is a circuit arrangement diagram of a display substrate provided by at least one embodiment of the present disclosure in a second antenna arranging region.

For example, in some embodiments, as shown in FIG. 1, the antenna layer 103 further includes a second antenna arranging region 103B at least partially surrounded by the first antenna arranging region 103A. For example, FIG. 5A shows a circuit layout diagram of the second antenna arranging region 103B, and as shown in FIG. 5A, the second antenna arranging region 103B includes a second antenna network, the second antenna network includes a plurality of second antenna lines 1032 insulated from the plurality of first antenna lines 1031. For example, extending directions and extending shapes of the plurality of second antenna lines 1032 and the plurality of first antenna lines 1031 are substantially the same.

For example, in some embodiments, as shown in FIG. 5A, a plurality of second antenna lines 1032 include a third sub-line 1032A extending in a first direction, and the third sub-line 1032A has a first break N1, to insulate the line portions on both sides of the first break N1.

For example, in some embodiments, as shown in FIG. 1, a plurality of subpixels SP include a plurality of second subpixels SP2 overlapping with the second antenna arranging region 103B in the direction perpendicular to the base substrate 101. In some embodiments, one row of first breaks N1 is correspondingly arranged for every two rows of second subpixels SP2, and one first break N1 is correspondingly arranged for each of the plurality of second subpixels SP2 in the row of the second subpixel where the first break N1 is arranged, thereby forming the second antenna network into a plurality of discrete portions.

For example, the third sub-line 1032A has an arc-shaped extension portion around the thin film transistor, that is, an avoidance portion 1032D, on which the first break N1 is provided. For example, in a direction perpendicular to the base substrate 101, the first break N1 and the second signal line 1022A at least partially overlap with each other, that is, at a position where the first break N1 is arranged, the third sub-line 1032A does not overlap with the second signal line 1022A, so as to reduce the overlapping area of the antenna layer 103 and the second signal line 1022A.

For example, in some embodiments, as shown in FIG. 5A, the plurality of second antenna lines 1032 include a fourth sub-line 1032B extending in the second direction, and the fourth sub-line 1032B has a second break N2 to insulate the line portions on both sides of the second break N2.

For example, in some embodiments, every three or four subpixels SP constitute a repeating unit. At this time, each repeating unit may include one red subpixel, one green subpixel and one blue subpixel, or each repeating unit may include one red subpixel, two green subpixels and one blue subpixel.

For example, each repeating unit is correspondingly provided with one second break N2, that is, every three or four second subpixels SP2 are correspondingly provided with one second break N2; alternatively, in other embodiments, one second break N2 may be correspondingly arranged for every multiple repeating units, or one second break N2 may be correspondingly arranged for each second subpixel SP2 or every two second subpixels SP2, thereby further forming the second antenna network into a plurality of discrete portions.

For example, in other embodiments, the second antenna line 1032 may be only provided with the second break N2 without the first break N1, or in other embodiments, the second antenna line 1032 may be only provided with the first break N1 without the second break N2, so that the second antenna network may also be formed into a plurality of discrete portions.

For example, in some embodiments, at least a portion of the plurality of second antenna lines 1032 are electrically connected with the common electrode 1071, so as to be connected in parallel with the common electrode 1071, thereby reducing the resistance of the common electrode 1071 and improving the display effect of the display substrate.

Figure 5B:
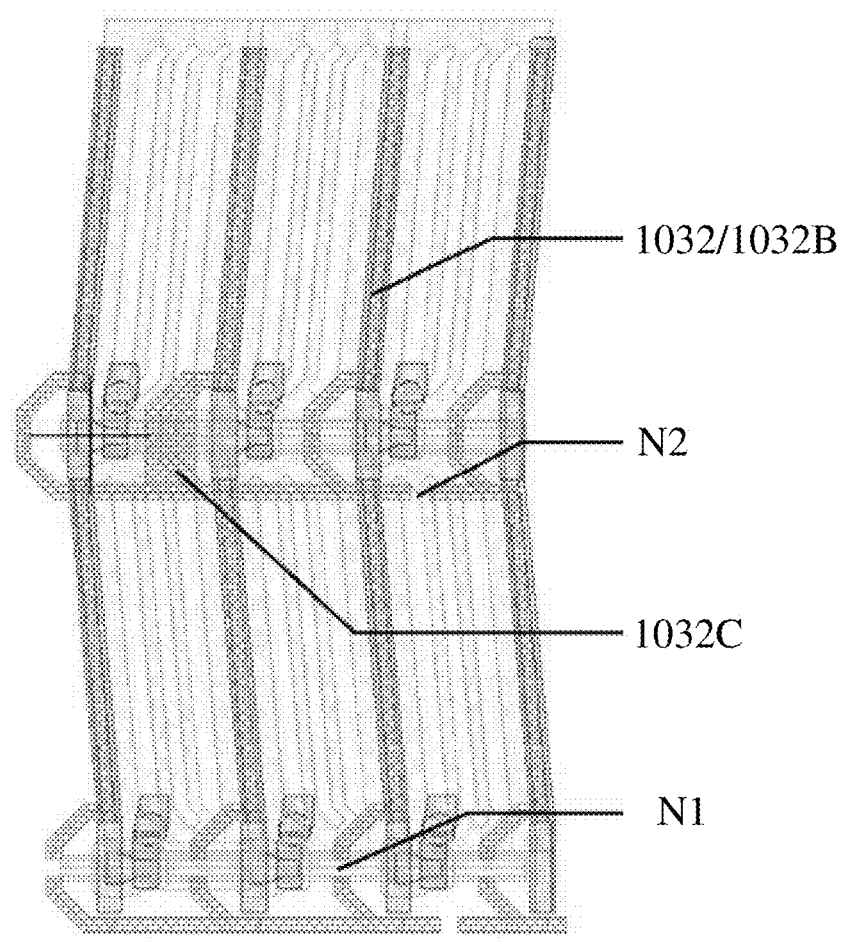
FIG. 5B is another circuit arrangement diagram of a display substrate provided by at least one embodiment of the present disclosure in a second antenna arranging region.

For example, in some embodiments, as shown in FIG. 5B, at least a portion of the plurality of second antenna lines 1032 includes an electrical connection part 1032C configured to be electrically connected with the common electrode 1071, for example, by a through hole (not shown) in the planarization layer PLN, the second passivation layer 109 and the buffer layer 106. For example, the line width of the electrical connection part 1032C is larger than that of the second antenna lines 1032 located at both sides of the electrical connection part 1032C, so that the electrical connection effect of the electrical connection part 1032C can be improved, the connection resistance can be reduced, and the connection reliability can be ensured.

For example, in some embodiments, each second subpixel SP2 may be correspondingly provided with one electrical connection part 1032C, or each repeating unit may be correspondingly provided with one electrical connection part 1032C, or each repeating unit may be provided with one electrical connection part 1032C. The embodiment of the present disclosure does not limit the arrangement density of the electrical connection parts 1032C.

In the embodiment of the present disclosure, because the second antenna arranging region 103B is surrounded by the first antenna arranging region 103A, and the first antenna line 1031 in the first antenna arranging region 103A is usually applied with a high-frequency alternating voltage signal (for example, 13.56 MHz) during operation, the capacitive reactance value of the capacitor varies with the capacitance value for high-frequency circuits, and the larger the capacitance value is, the smaller the capacitive reactance is when the frequency of the high-frequency circuit remains unchanged. If the plurality of second antenna lines 1032 in the second antenna arranging region 103A are all electrically connected to each other and are not electrically connected to other layers, an equivalent capacitance that cannot be ignored will be formed between the plurality of second antenna lines 1032 in the second antenna arranging region 103a and the plurality of first antenna lines 1031 in the first antenna arranging region 103a, and there is a risk of conduction under a high-frequency circuit, which will reduce the effective area of the coil formed by the first antenna network and affect the NFC function.

Through the above-mentioned break design, the plurality of second antenna lines 1032 may be distributed discretely, and the directly facing area of the plurality of first antenna lines 1031 and the plurality of second antenna lines 1032 is the smallest at the boundary between the first antenna arranging region 103A and the second antenna arranging region 103B. When a voltage signal is applied to a plurality of first antenna lines 1031, according to the capacitive coupling formula: $\Delta Vp=(V1-V2)*C_{MM}/(C_{MM}+C_{other})$ wherein $\Delta Vp$ is the voltage variation amount, V1 is the initial voltage, V2 is a voltage after changing, $C_{MM}$ is the parasitic capacitance between different regions of the antenna layer, and $C_{OTHER}$ is a sum of the parasitic capacitances between the antenna layer and other metal layers in the corresponding region. When a plurality of second antenna lines 1032 in the second antenna arranging region 103A are in a discrete state, the $C_{MM}$ of the first antenna arranging region 103A is the smallest, and the coupling voltage of the second antenna arranging region 103B to the first antenna arranging region 103A is the smallest, which has the smallest influence on the coil performance. For example, in some embodiments, the plurality of second antenna lines 1032 of the second antenna arranging region 103B may not be provided, so as to fundamentally avoid the generation of the coupling capacitance $C_{MM}$ caused by the plurality of second antenna lines 1032.

On the other hand, by electrically connecting a plurality of second antenna lines 1032 with the common electrode 1071, the resistance of the common electrode 1071 can be reduced, which is beneficial to the uniformity of the common electrode voltage of a plurality of second subpixels SP2 corresponding to the second antenna arranging region 103b, thereby improving the display effect in the region: at the same time, it can also prevent static electricity that may be caused by the second antenna line 1032 being completely floating (that is, having no electrical connection with other layers).

Figure 6:
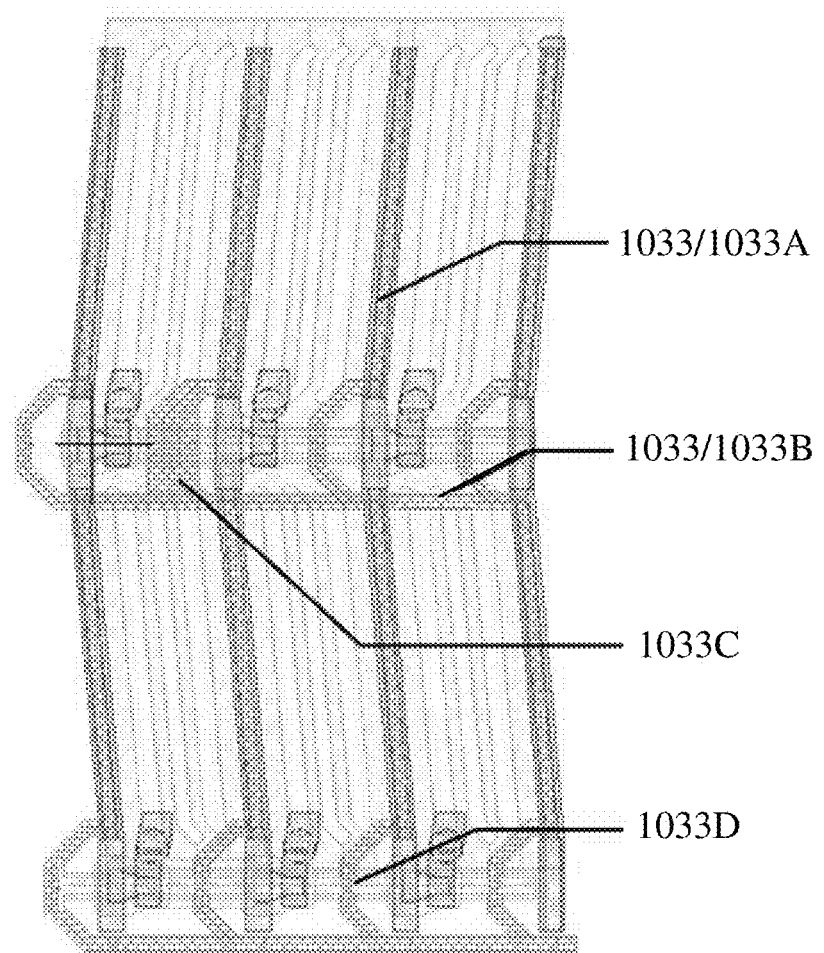
FIG. 6 is a circuit arrangement diagram of a display substrate provided by at least one embodiment of the present disclosure in a third antenna arranging region.

For example, in some embodiments, as shown in FIG. 1, the antenna layer 103 may further include a third antenna arranging region 103C disposed on a side of the first antenna arranging region 103A. For example, FIG. 6 shows a circuit layout diagram of the third antenna arranging region 103C, and as shown in FIG. 6, the third antenna arranging region 103C includes a third antenna network including a plurality of third antenna lines 1033 insulated from the plurality of first antenna lines 1031. For example, the extending directions and the extending shapes of the plurality of third antenna lines 1033 and the plurality of first antenna lines 1031 are approximately the same.

For example, as shown in FIG. 6, a plurality of third antenna lines 1033 include a fifth sub-line 1033A extending in a first direction and a sixth sub-line 1033B extending in a second direction, and the fifth sub-line 1033A and the sixth sub-line 1033B are electrically connected to form a third antenna network. For example, the fifth sub-line 1033A has an arc-shaped extending part at the position of the thin film transistor, that is, an avoidance portion 1033D.

Since the third antenna arranging region 103C is an outer region of the first antenna arranging region 103A, even the first antenna network in the first antenna arranging region 103A is energized with high-frequency alternating voltage, the plurality of third antenna lines 1033 in the third antenna arranging region 103C have little influence on the overall performance of the first antenna network, so that the plurality of third antenna lines 1033 may be connected with each other to form a criss-cross grid-like third antenna network, in which no break may be formed. Of course, in other embodiments, a break may also be formed.

For example, in some embodiments, at least a portion of the plurality of third antenna lines 1033 are electrically connected with the common electrode 1071, so as to reduce the resistance of the common electrode 1071 corresponding to the plurality of third subpixels SP3 corresponding to the third antenna arranging region 103C and improve the problem of uneven common voltage of the plurality of third subpixels SP3 corresponding to the third antenna arranging region 103C.

For example, as shown in FIG. 6, at least a portion of the plurality of third antenna lines 1033 includes an electrical connection part 1033C configured to be electrically connected with the common electrode 1071, for example, by using a through hole (not shown) in the planarization layer PLN, the second passivation layer 109 and the buffer layer 106. For example, the line width of the electrical connection part 1033C is larger than that of the third antenna lines 1033 located at both sides of the electrical connection part 1033C, so that the electrical connection effect of the electrical connection part 1033C can be improved, the connection resistance can be reduced, and the connection reliability can be ensured.

For example, in some embodiments, as shown in FIG. 1, the plurality of subpixels SP includes a plurality of third subpixels SP3 overlapping with the third antenna arranging region 103C. For example, each third subpixel SP3 may be correspondingly provided with one electrical connection part 1033C, or each repeating unit may be correspondingly provided with one electrical connection part 1033C, or every multiple repeating units may be correspondingly provided with one electrical connection part 1033C. The embodiment of the present disclosure does not limit the arrangement density of the electrical connection parts 1033C.

Figure 7:
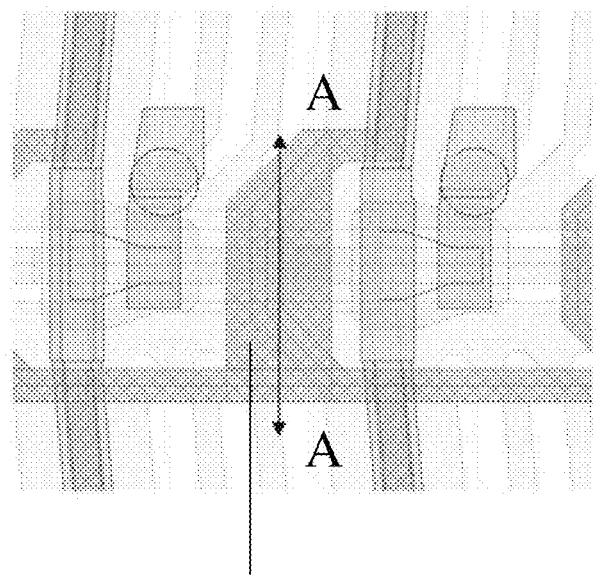
FIG. 7 is a schematic plan view of a display substrate provided by at least one embodiment of the present disclosure near an electrical connection part.
Figure 8:
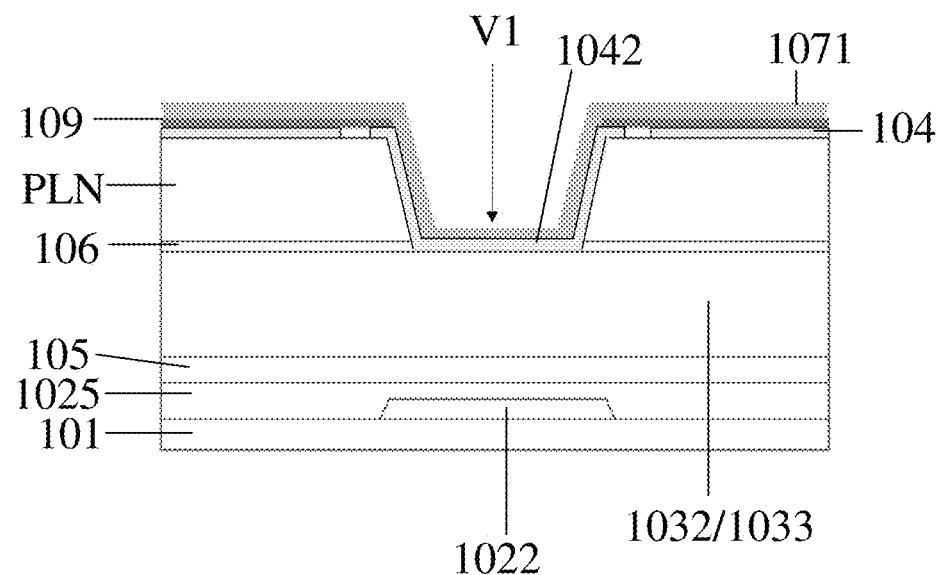
FIG. 8 is a schematic cross-sectional view of a display substrate in FIG. 7 along line A-A.

For example, FIG. 7 shows an enlarged schematic view near the electrical connection part 1032C of the second antenna line 1032 or near the electrical connection part 1033C of the third antenna line 1033, and FIG. 8 shows a cross-sectional schematic view along the line A-A in FIG. 7. As shown in FIGS. 7 and 8, the planarization layer PLN, the second passivation layer 109 and the buffer layer 106 have a through hole V1, and the common electrode 1071 is electrically connected to the second antenna line 1032 or the third antenna line 1033 through the through hole V1. For example, the pixel electrode layer 104 further includes an auxiliary electrical connection part 1042, and the auxiliary electrical connection part 1042 is also arranged in the through hole V1, so that the common electrode 1071 is electrically connected with the second antenna line 1032 or the third antenna line 1033 through the auxiliary electrical connection part 1042.

According to the test, by arranging the electrical connection part 1032C of the second antenna line 1032 and the electrical connection part 1033C of the third antenna line 1033, and connecting the electrical connection parts 1032C and 1033C to the common electrode 1071, the resistance of the common electrode 1071 can be reduced to $\frac{1}{4000}$ of an original resistance, which greatly reduces the resistance of the common electrode 1071.

For example, as shown in FIG. 8, in the manufacturing process, the through hole V1 is often formed by deep hole etching process, and at this time, the position of the buffer layer 106 is often over-etched. By using the auxiliary electrical connection part 1042 as a protective layer to protect the buffer layer 106, when the through hole V1 is etched, the auxiliary electrical connection part 1042 can play the role of etching stop, thus ensuring the connectivity between the common electrode 1071 and the electrical connection parts 1032C and 1033C.

Figure 9:
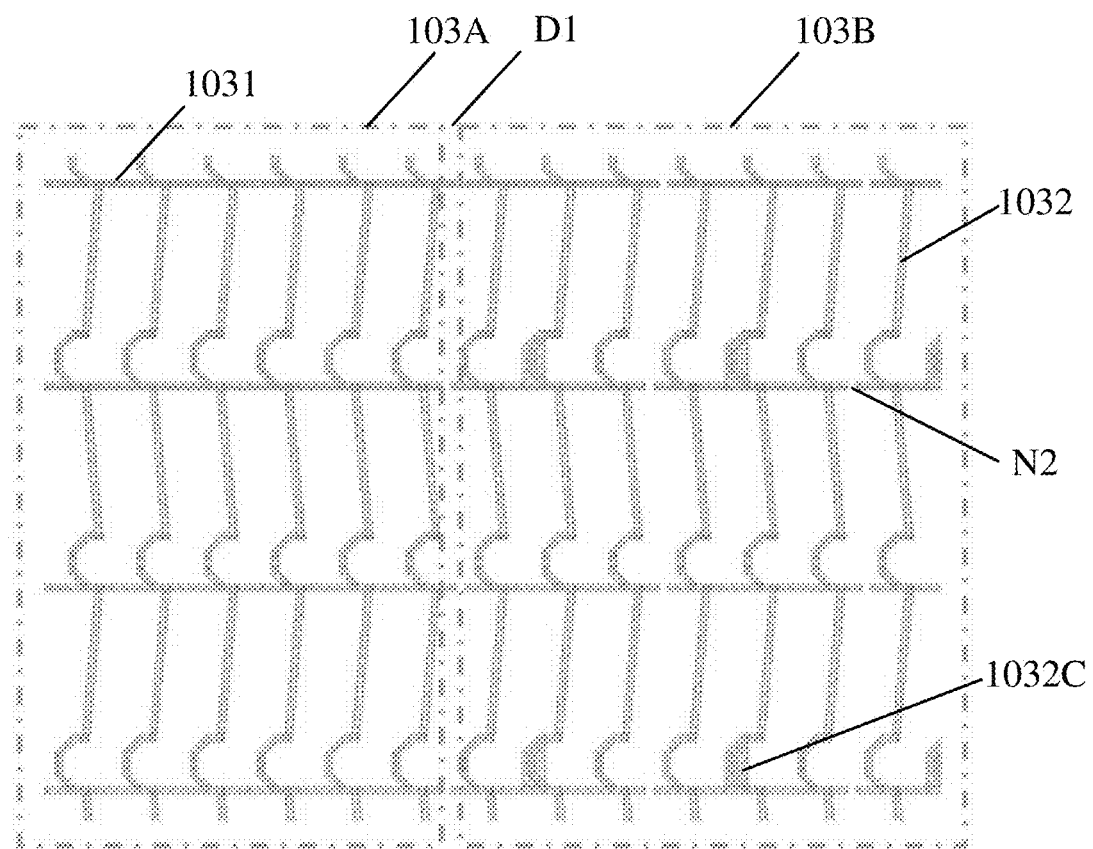
FIG. 9 is a circuit arrangement diagram of an antenna layer of a display substrate provided by at least one embodiment of the present disclosure in a first antenna arranging region and a second antenna arranging region.
Figure 10:
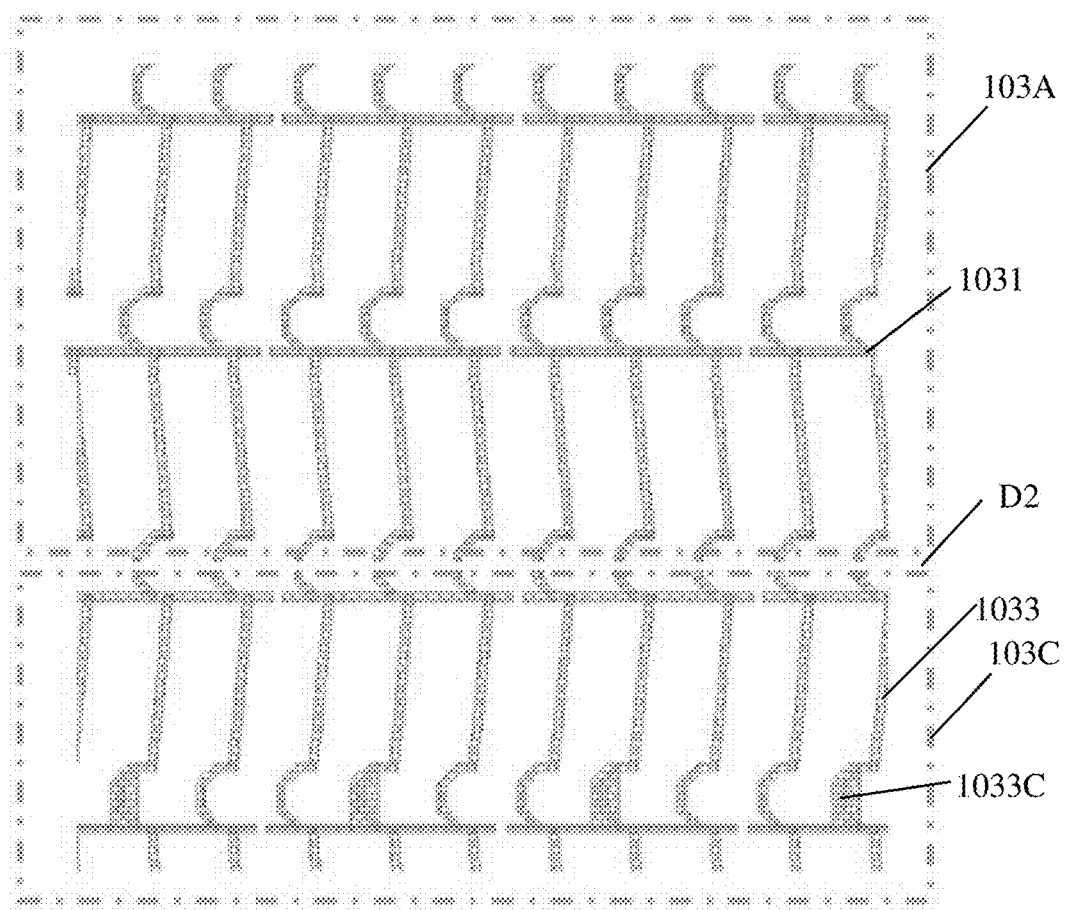
FIG. 10 is a circuit arrangement diagram of an antenna layer of a display substrate provided by at least one embodiment of the present disclosure in a first antenna arranging region and a third antenna arranging region.

For example, FIG. 9 shows a schematic plan view of the antenna layer 103 in the first antenna arranging region 103A and the second antenna arranging region 103B, and FIG. 10 shows a schematic plan view of the antenna layer 103 in the first antenna arranging region 103A and the third antenna arranging region 103C. As shown in FIGS. 9 and 10, in the first antenna arranging region 103A, a plurality of first antenna lines 1031 form a criss-cross first antenna network which is electrically connected with each other, so as to reduce the resistance of the first antenna network and fully realize the near-field communication function.

As shown in FIG. 9, in the second antenna arranging region 103B, a plurality of second antenna lines 1032 are criss-crossed, but they are not completely electrically connected due to the existence of the second break N2 (and in some embodiments, the first break N1). At the boundary region D1 of the first antenna arranging region 103A and the second antenna arranging region 103B (refer to FIG. 1, the boundary region D1 is located in both the first direction and the second direction between the first antenna arranging region 103A and the second antenna arranging region 103B, and only the boundary region D1 along the second direction is shown in FIG. 9), a plurality of first antenna lines 1031 are disconnected from a plurality of second antenna lines 1032 to achieve insulation. The plurality of second antenna lines 1032 are electrically connected to the common electrode 1071 through the electrical connection part 1032C disposed in at least a portion of the second subpixel SP2, so as to achieve the effect of reducing the resistance of the common electrode 1071.

As shown in FIG. 10, in the third antenna arranging region 103C, a plurality of third antenna lines 1033 are criss-crossed and electrically connected with each other, or in other embodiments, there may be a break between the plurality of third antenna lines 1033 to form a plurality of insulated portions. In the boundary region D2 of the first antenna arranging region 103A and the third antenna arranging region 103C, a plurality of first antenna lines 1031 are disconnected from a plurality of third antenna lines 1033 to achieve insulation. The plurality of third antenna lines 1032 are electrically connected to the common electrode 1071 through the electrical connection part 1032C arranged in a portion of the third subpixel SP3, so as to achieve the effect of reducing the resistance of the common electrode 1071.

In the embodiment of the present disclosure, in the antenna layer 103, the first antenna arranging region 103A is an effective antenna arranging region for realizing the near-field communication function, while the second antenna arranging region 103B arranged in the first antenna arranging region 103A and the third antenna arranging region 103B arranged outside the first antenna arranging region 103A are not used for realizing the near-field communication function, but at least used for electrically connecting with the common electrode 1071, so as to adjust the resistance of the common electrode 1071, improve the line arrangement uniformity of the antenna layer 103, and make the display effect of the display substrate more uniform.

For example, as shown in FIG. 1, the display substrate has a display region AA and a peripheral region NA surrounding the display region AA, and the display region AA includes a plurality of subpixels SP arranged in a plurality of rows and a plurality of columns. For example, in some embodiments, the first antenna network formed by a plurality of first antenna lines 1031 is located at least in the display region AA, for example, only in the display region AA, for example, in a partial region of the display region AA, which is shown as the upper region in FIG. 1, and in other embodiments, it may also be located in the lower region of the display region AA, or it may also be located in the whole display region AA, at this time, the third antenna arranging region 103C may not be provided: alternatively, in other embodiments, most of the first antenna network formed by the plurality of first antenna lines 1031 is located in the display region AA, but a small portion extends to the peripheral region NA.

For example, in some embodiments, as shown in FIG. 1, the display substrate further includes an antenna binding part B1, which is arranged in the peripheral region NA and located on a first side of the display region AA (shown as an upper side in FIG. 1, and which may also be a lower side, a left side or a right side of the display region AA in other embodiments), and at least a portion of the plurality of first antenna lines 1031 are bound to the antenna binding part B1 to be connected to an external circuit, such as near field communication control, for example, near field communication IC, through the antenna binding part B1.

For example, as shown in FIG. 1, the display substrate further includes a display structure binding part B2 for binding the first signal line and the second signal line to connect the first signal line and the second signal line to a display control circuit, such as a display IC, to realize a display function. For example, the display structure binding part B2 is located at a second side of the display region AA, which is shown as the lower side in the figure, and may be the upper side, the left side or the right side of the display region AA in other embodiments. For example, in some embodiments, the antenna binding part B1 and the display structure binding part B2 are arranged on different sides of the display region AA, such as opposite sides, to avoid forming a non-display region with a large area on the same side of the display region AA.

Figure 11:
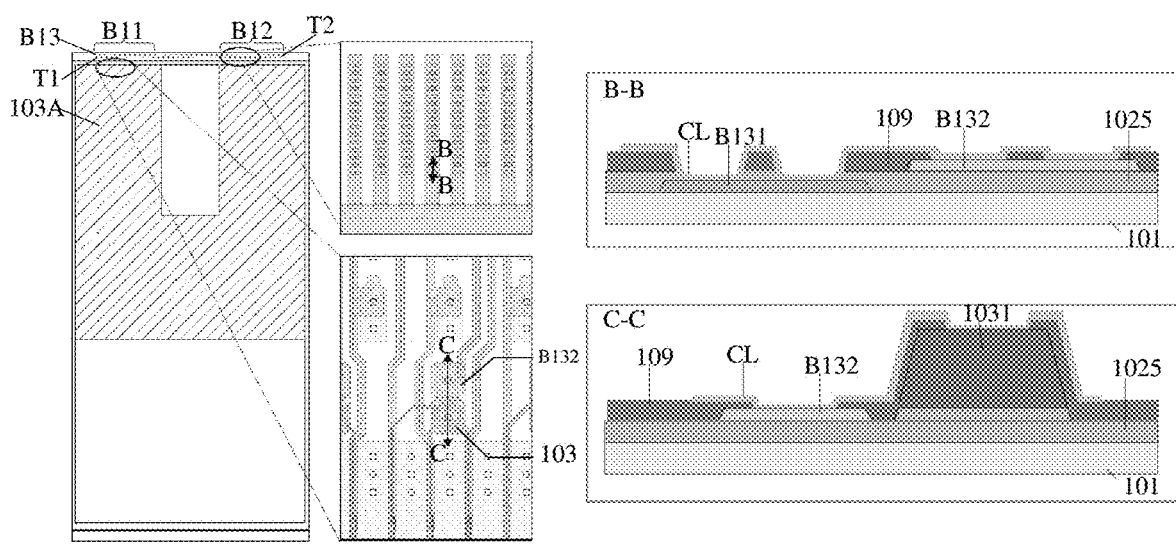
FIG. 11 is a schematic diagram showing that a plurality of first antenna lines of a display substrate provided by at least one embodiment of the present disclosure are bound with an antenna binding part.

For example. FIG. 11 shows a schematic structure in which the first antenna line 1031 is bound to the antenna binding part B1. As shown in FIG. 11, the antenna binding part B1 includes a first binding portion B11 and a second binding portion B12 which are arranged at intervals. The first binding portion B11 and the second binding portion B12 respectively include a plurality of binding pins B13, and a first end T1 (the left end in the figure) of a whole of a first antenna network formed by a plurality of first antenna lines 1031 is bound to a plurality of binding pins of the first binding portion B11. The second end T2 (the right end in the figure) is bound to a plurality of binding pins of the second binding portion B12, and the whole of the first antenna network forms a coil, such as a U-shaped coil shown in the figure, in the first antenna arranging region 103A, and is connected to an external circuit through the first binding portion B11 and the second binding portion B12 to form a closed coil.

For example, in some embodiments, the antenna binding part B1 may further include a plurality of binding pins between the first binding part B11 and the second binding part B12, but these binding pins are not used to connect the first antenna line 1031.

For example, in some embodiments, a plurality of binding pins B13 are disposed in the same layer as the gate electrode 1022 and/or the first source-drain electrode 1023. For example, FIG. 11 shows an enlarged schematic view and a cross-sectional schematic view of the binding pin B13 of the antenna binding part B1, that is, a cross-sectional schematic diagram along the line B-B in the enlarged schematic view. As shown in FIG. 11, the binding pin B13 includes a first conductive layer B131 and a second conductive layer B132, for example, the first conductive layer B131 is arranged in the same layer as the gate electrode 1022, and the second conductive layer B132 is arranged in the same layer as the first source-drain electrode 1023 and the second source-drain electrode 1024. By arranging a plurality of conductive layers, the transmission resistance of the binding pin B13 can be reduced and the antenna line performance can be improved.

It should be noted that in the embodiment of the present disclosure. "arranged in the same layer" means that two (or more) functional layers or structural layers are located in the same layer and formed of the same material in the layer-level structure of the display substrate, that is, in the manufacturing process, the two (or more) functional layers or structural layers may be formed of the same material layer, and the required patterns and structures may be formed by using the same patterning process.

For example, FIG. 11 also shows an enlarged schematic view and a cross-sectional schematic view of the connection position of the first antenna line 1031 and the binding pin B13, that is, a cross-sectional schematic view along the line C-C in the enlarged schematic view. As shown in FIG. 11, the first end T1 and the second end T2 are electrically connected with the plurality of binding pins B13 of the first binding portion B11 and the second binding portion B12 through a plurality of connection lines CL, respectively. For example, the connection line CL extends through the first antenna line 1031, the second conductive layer B132 and the first conductive layer B131, respectively, thereby realizing the electrical connection between the first antenna line 1031 and the binding pin B13.

Through the design of the above-mentioned multiple connection lines CL, it can be avoided that the thickness of the sealant in the peripheral region NA increases which is caused by directly connecting the antenna layer 103 to the binding pin B13 when the thickness of the antenna layer 103 is too large, and then the defect, such as the color deviation of the display color, can be avoided. Through the above design, the antenna layer 103 is only arranged inside the display region AA, and does not extend to the region where the sealant in the peripheral region NA is located, so as to avoid causing the local thickness to be abnormally high. On the other hand, as shown in FIG. 11, at the binding position of the first antenna line 1031 and the binding pin B13, the first passivation layer 105 and the buffer layer 106 are completely etched, only two layers, namely the gate insulating layer 1025 and the second passivation layer 109 are left, thereby further reducing the thickness of the binding position.

For example, in some embodiments, a plurality of connection lines CL are arranged in the same layer as the common electrode 1071 to simplify the structure and manufacturing process of the display substrate.

Alternatively, in other embodiments, when the thickness of the antenna layer 103 is relatively small, the first antenna line 1031 may also directly extend to the binding pin B13 for electrical connection with the binding pin B13.

For example, in some embodiments, as shown in FIGS. 1 and 11, the first antenna arranging region 103A is U-shaped, so that a plurality of first antenna lines 1031 are fully arranged in the first antenna arranging region 103A to form a U-shaped coil, and both ends of the U-shape respectively include the first end T1 and the second end T2.

For example, in some embodiments, the U-shape may include a single U-shape to form a single turn coil, or in some embodiments, the U-shape may include a plurality of sub-U-shapes nested with each other to form a multi-turn coil to optimize NFC antenna performance.

Figure 12:
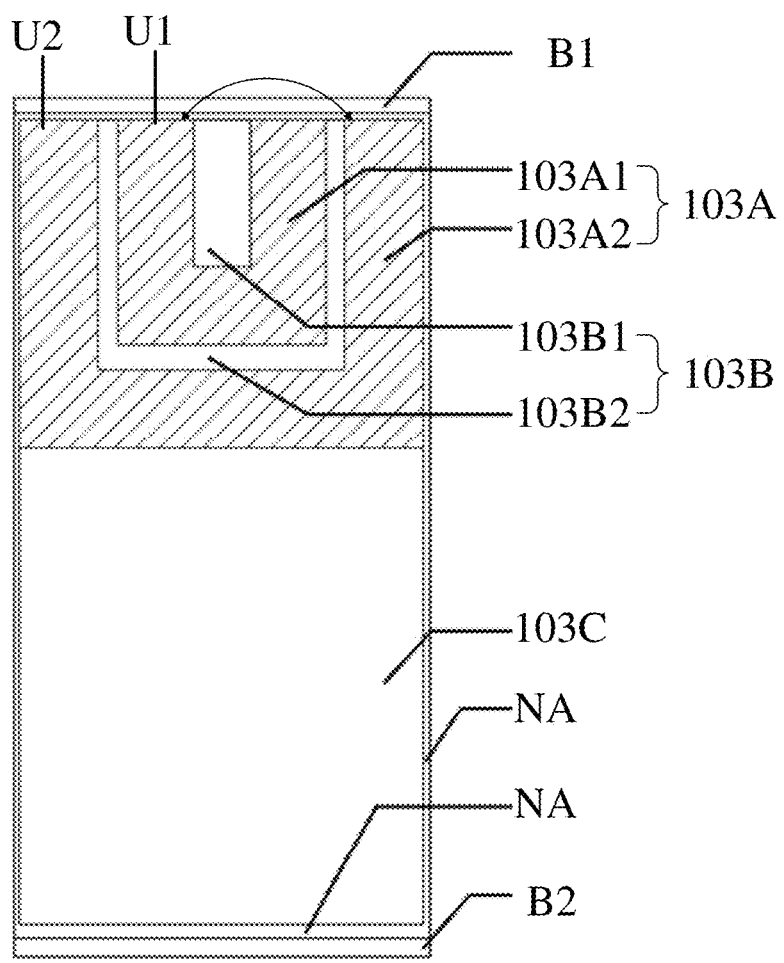
FIG. 12 is another schematic plan view of a display substrate provided by at least one embodiment of the present disclosure.

For example, FIG. 12 shows an arrangement view of various regions of another antenna layer. As shown in FIG. 12, in this embodiment, the U-shape includes a first U-shape U1 and a second U-shape U2 nested with each other, and the second U-shape U2 surrounds the first U-shape U1, and a plurality of first antenna lines 1031 located at an end (e.g., the left end) of the first U-shape U1 are electrically connected with a plurality of first antenna lines 1031 located at an end (e.g., the right end) of the second U-shape, as shown by an arrow in FIG. 12. A plurality of first antenna lines 1031 at the other end (e.g., the right end) of the first U-shaped U1 and a plurality of first antenna lines 1031 at the other end (e.g., the left end) of the second U-shaped U1 are respectively configured to be bound with the first binding part B11 and the second binding part B12, so as to connect the external circuit and form a two-turn coil.

For example, in other embodiments, the U-shape may also include more sub-U-shaped coils nested with each other to form a multi-turn coil, and its structure is similar to that of the double-turn coil in FIG. 12, which will not be described here.

For example, in the embodiment of FIG. 12, the first antenna arranging region 103A includes a first antenna arranging sub-region 103A1 and a second antenna arranging sub-region 103A2, which are used for arranging the first antenna line 1031, for example, configured to realize near-field communication function or other communication functions; The second antenna arranging region 103B includes a third antenna arranging sub-region 103B1 and a fourth antenna arranging sub-region 103B2 for arranging the above-mentioned second antenna line 1032, and the arranging method of the second antenna arranging region 103C is the same as that of the embodiment of FIG. 1, which is not repeated here.

For example, in the embodiments of FIG. 1, FIG. 11 and FIG. 12, the above U-shape is a regular U-shape. In other embodiments, the U-shape may also have some variants. For example, in some embodiments, the U-shape includes a fold line part between the first end T1 and the second end T2, that is, a portion of the outline of the U-shape is a broken line. For example, the broken line may be recessed towards inside the coil, so as to increase the area surrounded by the coil without having a great influence on the coil resistance.

Figure 13:
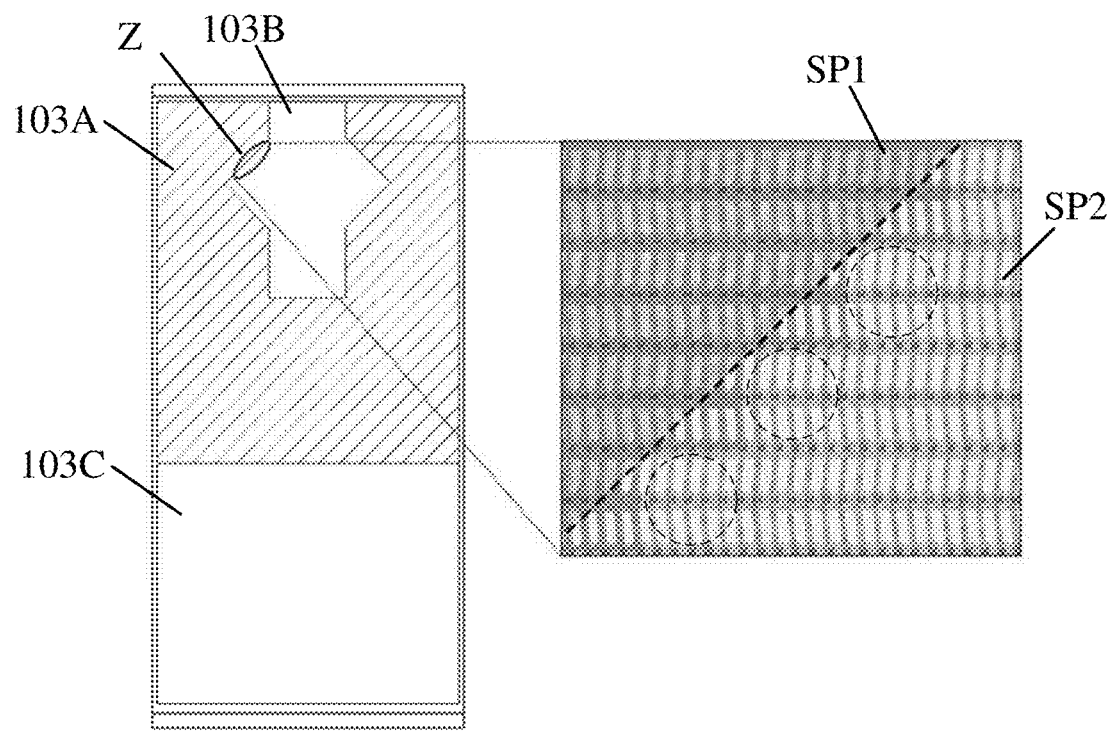
FIG. 13 is another schematic plan view of a display substrate provided by at least one embodiment of the present disclosure.
Figure 14:
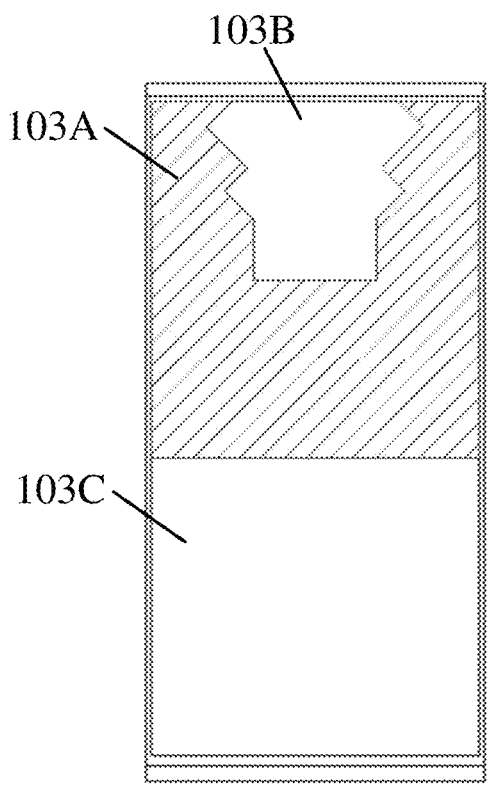
FIG. 14 is yet another schematic plan view of a display substrate provided by at least one embodiment of the present disclosure.

For example, FIG. 13 and FIG. 14 show the schematic arrangement view of each region of the other two antenna layers. As shown in FIGS. 13 and 14, the first antenna arranging region 103A is still U-shaped as a whole, but the boundary line portion of the first antenna arranging region 103A and the second antenna arranging region 103B is in a broken line shape, so that it has one or more sharp corner portions extending towards the inside of the coil. For example, in some embodiments, the angle of the sharp corner portion may be 90 degrees or other suitable angles.

For example, as shown in the arrangement view of the first subpixel SP1 and the second subpixel SP2 at the right side of FIG. 13, at the boundary line portion being in the fold line shape of the first antenna arranging region 103A and the second antenna arranging region 103B, the first subpixel SP1 corresponding to the first antenna arranging region 103A and the second subpixel SP2 corresponding to the second antenna arranging region 103B are staggered, for example, by at least one complete repeating unit, so as to ensure that each repeating unit corresponds to the same antenna arranging region, and avoid that signals transmitted by different antenna arranging regions are different which affect the light-emitting state of a plurality of subpixels in the same repeating unit.

For example, in some embodiments, as shown in FIG. 13, the numbers of the first subpixels SP1 and the second subpixels SP2 in the N-th row of subpixels are different from the numbers of the first subpixels SP1 and the second subpixels SP2 in the N+1-th row of subpixels at the position of the fold line part Z, respectively.

For example, N is a positive integer greater than or equal to 1. At this time, the numbers of the first subpixel SP1 and the second subpixel SP2 in every two adjacent rows of subpixels are different. Alternatively, N is an odd number greater than or equal to 1, in this case, the numbers of the first subpixel SP1 and the second subpixel SP2 in each odd row and the numbers of the first subpixel SP1 and the second subpixel SP2 in even row after the odd row are different, but the numbers of the first subpixel SP1 and the second subpixel SP2 in each odd row and the numbers of the first subpixel SP1 and the second subpixel SP2 in even row before the odd row are the same. In this case, the numbers of the first subpixel SP1 and the second subpixel SP2 in each two rows of subpixels are the same. Alternatively, N is an even number equal to 1, in this case, the numbers of the first subpixels SP1 and the second subpixels SP2 in each even row and the numbers of the first subpixels SP1 and the second subpixels SP2 in odd row after the even row are different, but the numbers of the first subpixels SP1 and the second subpixels SP2 in each even row and the numbers of the first subpixels SP1 and the second subpixels SP2 in an odd row before the even row are the same. In this case, the numbers of the first subpixels SP1 and the second subpixels SP2 in every two rows of subpixels are the same.

For example, as shown in FIG. 13, in the embodiment, N is an even number, and the numbers of the first subpixels SP1 and the second subpixels SP2 in every two rows of subpixels are the same, but the numbers of the first subpixels SP1 and the second subpixels SP2 in the even row and the next odd row of the even row are different. For example, as shown in FIG. 13, the numbers of the first subpixels SP1 and the second subpixels SP2 in the first and second rows are the same, the numbers of the first subpixels SP1 and the second subpixels SP2 in the second and third rows are different, for example, a number difference of subpixels is the number of subpixels of two repeating units, the number difference is six in this embodiment, so that the first subpixels SP1 and the second subpixels SP2 in each two rows of subpixels are offset by 2×2 repeating units, as shown by the dotted circle in FIG. 13. For example, in this embodiment, one domain is formed by the electrode driving electric field of the subpixel corresponding to every 2×2 repeating units, so that each domain may correspond to the same antenna arranging region through the above configuration, so as to avoid the adverse effects of different antenna arranging regions on the above domain, and further avoid the adverse effects on the display effect of the display substrate.

For example, in other embodiments, when the electrode driving electric field of the subpixel corresponding to one repeating unit forms one domain, the first subpixel SP1 and the second subpixel SP2 in every two adjacent rows of subpixels may be staggered by one repeating unit, and at this time, each domain may also correspond to the same antenna arranging region, thereby also avoiding adverse effects on the display effect of the display substrate.

Figure 15:
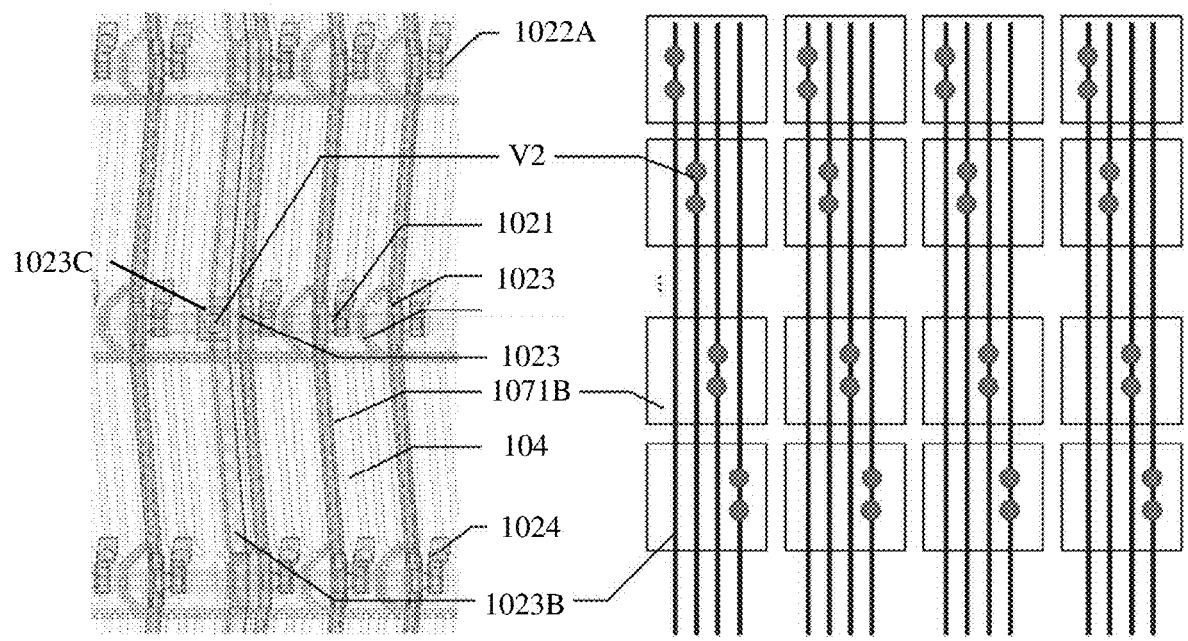
FIG. 15 is a schematic plan view of an integrated touch control structure of a display substrate provided by at least one embodiment of the present disclosure.

For example, in some embodiments, the display substrate may be formed as a TDD1 (Touch and Display Driver Integration) display substrate, that is, a display substrate integrating touch and display driving. At this time, as shown in FIG. 15, the common electrode 1071 may be multiplexed as a touch control structure, including a plurality of sub-electrodes 1071B, and the whole of each of the sub-electrodes 1071B is in a block shape. For example, each sub-electrode 1071B includes a plurality of strip electrodes which are electrically connected with each other, and the whole of the strip electrodes which are electrically connected with each other forms a block shape, but different sub-electrodes 1071B are insulated to form a plurality of block-shaped sub-electrodes 1071B which are insulated from each other for realizing the touch control function.

For example, as shown in FIG. 15, the display substrate further includes a plurality of touch control lines 1023B, which are electrically connected to the plurality of sub-electrodes 1071B, respectively, and configured to provide a touch control signal, such as a pulse voltage signal, to the plurality of sub-electrodes 1071B in the touch control stage.

For example, in some embodiments, the plurality of touch control lines 1023B are further configured to provide a display signal, such as a DC voltage signal, to the plurality of sub-electrodes 1071B in the displaying stage. At this time, a plurality of sub-electrodes 1071B are used to provide a displaying signal and a touch control signal in a time-sharing manner, and the common electrode 1071 is simultaneously used as the touch control electrode and the common electrode of the subpixel, thereby achieving the technical effect that the same structure achieves the display function and the touch control function, that is, realizing the above TDD1 display substrate.

For example, in some embodiments, the touch control structure formed by a plurality of sub-electrodes 1071B may be a self-capacitive touch control structure. When an operating body, such as a finger, touches the screen, due to the electric field of the human body, the finger and the sub-electrode 1071B at the touch control position will form one coupling capacitor, which causes the original capacitance of the sub-electrode 1071B to change. By detecting the position of the sub-electrode 1071B which is changed, the touch control position may be obtained.

For example, in some embodiments, a plurality of touch control lines 1023B, the first signal line 1023A and the first source-drain electrode 1023 are arranged in the same layer, to simplify the structure and the manufacturing process of the display substrate.

For example, in some embodiments, the extension direction of the plurality of touch control lines 1023B is approximately the same as that of the first signal line 1023A, for example, the touch control lines 1023B are arranged adjacent to and in parallel with the first signal line 1023A, so that the non-display structures of the display substrate can be centrally arranged in the same region, to improve the aperture ratio of the display substrate.

Figure 16:
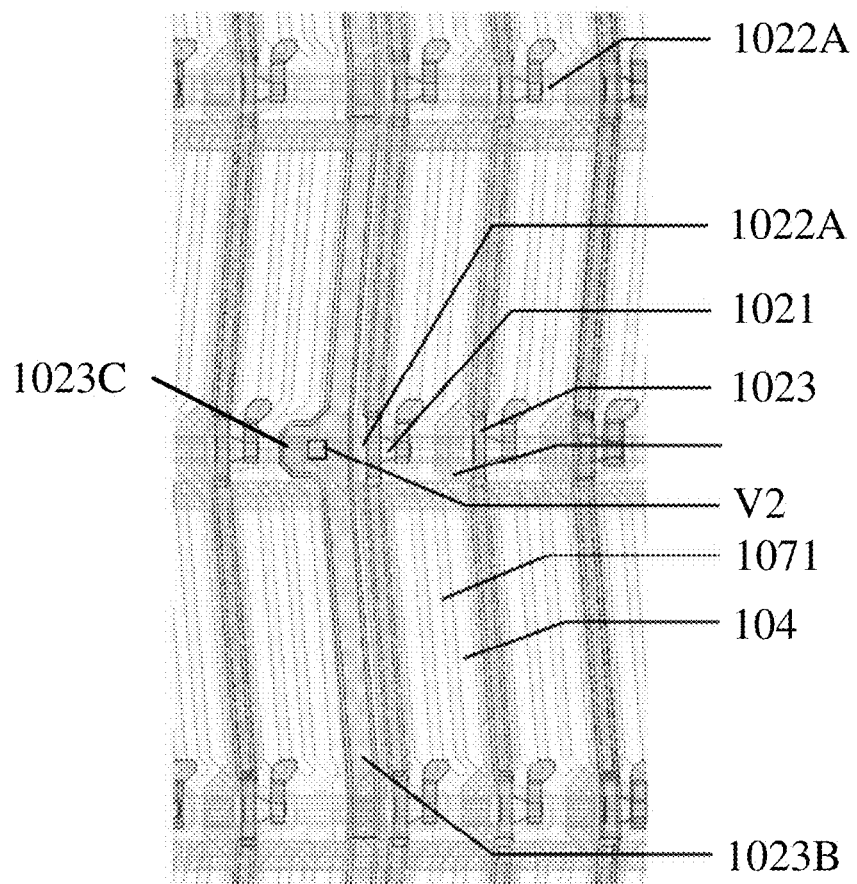
FIG. 16 is another schematic plan view of the integrated touch control structure of a display substrate provided by at least one embodiment of the present disclosure.

For example, in some embodiments, as shown in FIGS. 15 and 16, the plurality of touch control lines 1023B respectively include touch control connection parts 1023C, and the touch control connection parts 1023C are configured to be electrically connected with the plurality of sub-electrodes 1071B, for example, by using a through hole (not shown) in the first passivation layer 105 and the second passivation layer 106. For example, a plurality of first sub-lines 1031A are disconnected at the position of the touch control connection part 1023C, so as to avoid the signal transmission error caused by the wrong connection of the antenna line and the touch control line 1023B.

For example, the touch control connection part 1023C is arranged at a side of the thin film transistor, so that at the position, the first sub-line 1031A is no longer provided with an arc-shaped extension portion, that is, an avoidance portion, as shown in FIGS. 15 and 16.

For example, one end of the plurality of touch control lines 1023B is connected to the sub-electrode 1071B, and the other end is connected to a driving IC (not shown) with a touch control integration function, thereby realizing the corresponding touch control function. For example, each sub-electrode 1071B corresponds to a plurality of subpixels SP, and only a portion of the corresponding subpixels SP may be correspondingly provided with the above-mentioned touch control connection parts 1023C, while other subpixels SP are not provided with the above-mentioned touch control connection parts 1023C, as long as the electric connection between the touch control line 1023B and the sub-electrode 1071B can be realized.

Therefore, in the display substrate provided by the embodiment of the present disclosure, three functions of displaying, touch control and NFC communication can be integrated.

For example, in the embodiment of the present disclosure, the base substrate 101 may be a rigid substrate such as glass or quartz or a flexible substrate such as polyimide (PI). Materials of the active layer 121 include, but are not limited to, silicon-based materials (amorphous silicon a-Si, polysilicon p-Si, etc.), metal oxide semiconductors (IGZO, ZnO, AZO, IZTO, etc.) and organic materials (sexithiophene, polythiophene, etc.). In the manufacturing process, a portion of the semiconductor material of the active layer 121 is conductive to have good conductivity. For example, metal materials such as copper (Cu), aluminum (Al), molybdenum (Mo), magnesium (Mg), titanium (Ti), tungsten (W) or alloy materials may be used for the gate electrode 1022 and the source and drain electrodes 123 and 124. For example, the gate electrode 1022 and the source and drain electrodes 1023 and 1024 may have a single-layer or multi-layer structure, such as a multi-layer metal structure such as Ti/Al/Ti or Mo/Al/Mo.

For example, the gate insulating layer 1025, the first passivation layer 105, the buffer layer 106 and the second passivation layer 106 may be inorganic insulating layers, for example, made of inorganic insulating materials such as silicon oxide (SiOx), silicon nitride (SiNy) or silicon oxynitride (SiOxNy). The spacer 108 may use an organic insulating material, such as polyimide, resin and other organic materials.

For example, the thin film transistor TFT shown in FIG. 2 is of the bottom gate type, and the gate electrode 1022 is disposed on a side of the active layer 121 close to the base substrate 101. For example, in other embodiments, the thin film transistor TFT may also be of the top gate type, and the gate electrode 1022 is arranged on a side of the active layer 121 far away from the base substrate 101. The embodiment of the present disclosure does not limit the specific form of the thin film transistor TFT.

For example, in some embodiments, the pixel electrode layer 104 and the common electrode layer 107 may adopt transparent metal oxide materials, such as indium tin oxide (ITO), indium zinc oxide (IZO), etc., to improve their transparency.

At least one embodiment of the present disclosure also provides a manufacturing method of a display substrate, which comprises the following steps: providing a base substrate; forming a pixel driving circuit layer on the base substrate, wherein the pixel driving circuit layer comprises a thin film transistor and a plurality of signal lines; and forming an antenna layer on a side of the pixel driving circuit layer far away from the base substrate, wherein the antenna layer comprises a first antenna arranging region, and the first antenna arranging region comprises a first antenna network formed by a plurality of first antenna lines; and in a direction perpendicular to the display substrate, at least a portion of the plurality of first antenna lines overlap with at least a portion of the plurality of signal lines.

For example, the manufacturing method of the display substrate may be used for manufacturing the display substrate provided by the embodiment of the present disclosure. For example, in the manufacturing process of the above display substrate, a material layer of a gate electrode 1022 may be firstly formed on the base substrate 101 by using a process such as sputtering or deposition, and then the material layer of the gate electrode 1022 may be patterned by using a first mask to form the gate electrode 1022. For example, one patterning process includes forming a photoresist, exposing, developing, etching and other processes, which will not be described in detail in the embodiment of the present disclosure.

For example, after the gate electrode 1022 is manufactured, a gate insulating layer 1025 is formed on the gate electrode 1022 by using a process such as deposition, and then an active material layer is formed on the gate insulating layer 1025 by using a process such as sputtering or deposition, and then the active material layer is patterned by using a second mask to form a pattern of the active layer 121. For example, after the pattern of the active layer 121 is formed, a doping process may be performed on a portion of the active layer 121, so as to be conductive at the connection position of the source and drain electrodes 1023 and 1024.

For example, after the active layer 121 is manufactured, a source-drain electrode material layer is formed on the active layer 121 and the gate insulating layer 1025 by using a process such as sputtering or deposition, and then the source-drain electrode material layer is patterned by using a third mask to form the source-drain electrodes 1023 and 1024.

For example, after the source and drain electrodes 1023 and 1024 are manufactured, a first passivation material layer is formed on the source and drain electrodes 1023 and 1024 by using a process such as sputtering or deposition to form the first passivation layer 105.

For example, after manufacturing the first passivation layer 105, an antenna material layer is formed on the first passivation layer 105 by using a process such as sputtering, deposition or electroplating, and then the antenna material layer is patterned by using a fourth mask to form the antenna layer 103.

For example, after the antenna layer 103 is manufactured, a buffer material layer is formed on the antenna layer 103 by using a process such as sputtering or deposition to form the buffer layer 106.

For example, after the buffer layer 106 is manufactured, a planarization material layer is formed on the buffer layer 106 by using a process such as coating or deposition, and then the planarization material layer and the buffer layer 106 are simultaneously patterned by using a fifth mask, to form a planarization layer PLN; alternatively, in some embodiments, the fifth mask may be used to pattern the planarization material layer, and then the patterned planarization material layer may be used to pattern the buffer layer 106, thereby avoiding the increase in the total number of masks caused by the adoption of an independent mask for the buffer layer 106. For example, in some embodiments, the first passivation layer 105 may be patterned at the same time as the planarization material layer is patterned by using the fifth mask, so as to save the masks.

For example, after the planarization layer PLN is manufactured, a pixel electrode material layer is formed on the planarization layer PLN by using a process such as sputtering or deposition, and then the pixel electrode material layer is patterned by using a sixth mask to form the pixel electrode 1041.

For example, after the pixel electrode 1041 is manufactured, a second passivation material layer is formed on the pixel electrode 1041 by using a process such as sputtering or deposition, and then the second passivation material layer is patterned by using a seventh mask, or the second passivation material layer, the planarization layer PLN and the buffer layer 106 are simultaneously patterned, or the second passivation material layer and the gate insulating layer 1025 are simultaneously patterned (at this time, it can be avoided that the total number of the masks increase because the buffer layer and the gate insulating layer 1025 use the independent masks)

For example, in the embodiment of the present disclosure, because the second passivation layer 109 is a deep hole at the through hole V1 and so on, it is obtained by using a deep hole etching process, which often requires over-etching to etch through the gate insulating layer 1025. At this time, the exposed buffer layer 106 in the hole is prone to have undercut and other defects caused by over-etching. At this time, it may be protected by adding an auxiliary electrical connection part 1042 in the same layer as the pixel electrode 1041 in the through hole, to avoid the defects caused by over-etching.

For example, after manufacturing the second passivation layer 109, a common electrode material layer is formed on the second passivation layer 109 by using a sputtering or deposition, and then the common electrode material layer is patterned by using an eighth mask to form the common electrode layer 107.

Therefore, eight masks may be used to complete the manufacturing of the display substrate shown in FIGS. 1-3. The manufacturing process is simpler and easier, and the display structure, the touch control structure and the antenna structure for realizing the near field communication function may be formed at the same time.

Figure 17:
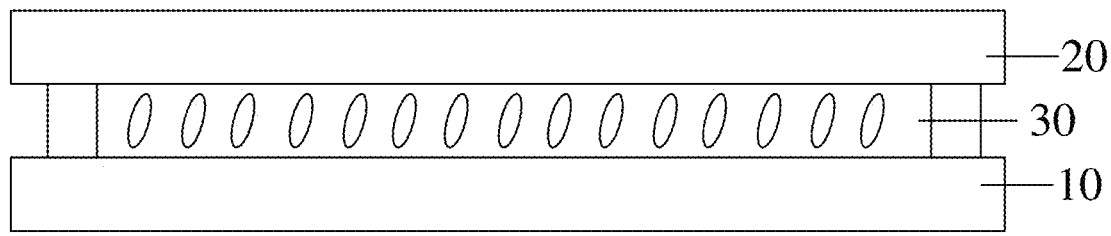
FIG. 17 is a schematic sectional view of a display device provided by at least one embodiment of the present disclosure.
Figure 18:
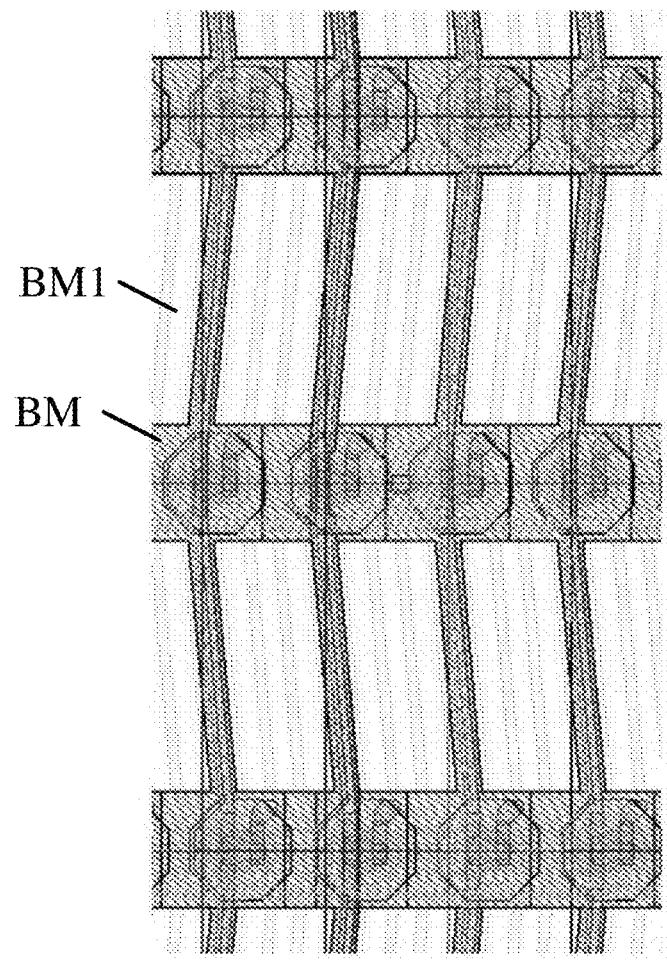
FIG. 18 is a schematic plan view of a display device provided by at least one embodiment of the present disclosure.

At least one embodiment of the present disclosure provides a display device, which may be a liquid crystal display device in some embodiments. FIG. 17 shows a schematic cross-sectional view of the display substrate. As shown in FIG. 17, the display device includes a display substrate 10, an opposite substrate 20 and a liquid crystal layer 30 provided by the embodiment of the present disclosure. The opposite substrate 20 is opposite to the display substrate 10, and the liquid crystal layer 30 is located between the display substrate 10 and the opposite substrate 20.

For example, in some embodiments, the opposite substrate 20 may be a color filter substrate, including a black matrix layer BM and a plurality of color filter patterns (not shown). The black matrix layer BM includes a plurality of subpixel openings BMI, and a plurality of color filter patterns are respectively arranged in the plurality of subpixel openings BMI, to filter the light emitted from the plurality of subpixel openings BMI. For example, the orthographic projection of the plurality of first antenna lines 1031 on the base substrate 101 is located inside the orthographic projection of the black matrix layer BM on the base substrate 101, so that the display effect of the display substrate will not be affected.

For example, the plurality of color filter patterns may include a red filter pattern, a green filter pattern, and a blue filter pattern to realize full-color display. Alternatively, in other embodiments, the plurality of color filter patterns CF may also have other colors, and the embodiment of the present disclosure does not specifically limit this.

For example, the opposite substrate 20 may also include other structures besides the above-mentioned structures. For details, the related art may be referred, and the embodiment of the present disclosure will not be described in detail.

In the above-mentioned display device provided by the embodiment of the present disclosure, the range of subpixel openings BMI of the black matrix layer BM is large. Taking a 5.65-inch display device as an example, the aperture ratio of the display device can reach more than 54.7%, which is much higher than that of a display substrate with an antenna layer in the conventional technology. For example, the aperture ratio of a display substrate with an antenna layer in the conventional technology can only reach 46.8% at the highest. Therefore, the display device provided by the embodiment of the present disclosure not only has a good near-field communication function, but also has a higher aperture ratio to improve the display effect of the display device.

The following points need to be explained:
(1) The drawings of the embodiment of this disclosure only relate to the structure related to the embodiment of this disclosure, and other structures may refer to the general design.
(2) For the sake of clarity, in the drawings used to describe the embodiments of the present disclosure, the thickness of layers or regions is enlarged or reduced, that is, these drawings are not drawn according to the actual scale. It will be understood that when an element such as a layer, film, region or substrate is referred to as being "on" or "under" another element, the element may be "directly on" another element or "directly under" another element or intervening elements may be present.

(3) In the case of no conflict, the embodiments of the present disclosure and the features in the embodiments may be combined with each other to obtain a new embodiment.

The above is only the specific embodiment of the present disclosure, but the protection scope of the present disclosure is not limited to this, and the protection scope of the present disclosure should be determined by the protection scope of the claims.

The invention claimed is:

1. A display substrate, comprising:
a base substrate;
a pixel driving circuit layer, arranged on the base substrate and comprising a thin film transistor and a plurality of signal lines;
an antenna layer, arranged on a side of the pixel driving circuit layer far away from the base substrate, and the antenna layer comprising a first antenna arranging region, the first antenna arranging region comprising a first antenna network formed by a plurality of first antenna lines,
wherein in a direction perpendicular to the display substrate, at least a portion of the plurality of first antenna lines overlap with at least portion of the plurality of signal lines,
wherein the thin film transistor comprises a gate electrode, a first source-drain electrode and a second source-drain electrode,
the plurality of signal lines include a first signal line electrically connected with the first source-drain electrode and extending substantially in a first direction, and the plurality of first antenna lines include a first sub-line extending substantially in the first direction, and
in a direction perpendicular to the base substrate, the first signal line and the first sub-line at least partially overlap with each other,
wherein a line width of the first sub-line is less than or equal to a line width of the first signal line,
wherein the display substrate further comprises:
a planarization layer, arranged on a side of the antenna layer far away from the base substrate to planarize the antenna layer,
wherein the display substrate further comprises:
a pixel electrode layer, arranged on a side of the planarization layer far away from the base substrate and comprising a pixel electrode,
wherein the planarization layer comprises a pixel through hole, and the pixel electrode is electrically connected with the second source-drain electrode of the thin film transistor at least through the pixel through hole,
wherein the display substrate further comprises:
a common electrode layer, arranged on a side of the pixel electrode layer far away from the base substrate and insulated from the pixel electrode layer and including a common electrode,
wherein the common electrode comprises a bending part,
in a direction perpendicular to the base substrate, the bending part at least partially overlaps with a second sub-line.

2. The display substrate according to claim 1, wherein the pixel driving circuit layer further comprises a second signal line electrically connected to the gate electrode and extending substantially in a second direction, and the plurality of first antenna lines comprise the second sub-line extending substantially in the second direction, the first sub-line is electrically connected with the second sub-line, to form the first antenna network,
wherein the second signal line and the second sub-line do not overlap in a direction perpendicular to the base substrate.

3. The display substrate according to claim 2, wherein the first sub-line includes an avoidance portion at a position of the thin film transistor, and the avoidance portion overlaps the second signal line in the direction perpendicular to the base substrate.

4. The display substrate according to claim 1, wherein the display substrate has a plurality of subpixels arranged in a plurality of rows and a plurality of columns in an array,
the plurality of subpixels include a plurality of first subpixels overlapping with the first antenna arranging region in a direction perpendicular to the base substrate,
an orthographic projection of each of the plurality of first subpixels on the base substrate overlaps with an orthographic projection of the plurality of first antenna lines on the base substrate.

5. The display substrate according to claim 1, further comprising:
a spacer, arranged on a side of the antenna layer far away from the base substrate,
in a direction perpendicular to the base substrate, the spacer overlaps with the thin film transistor, and the plurality of first antenna lines do not overlap with the spacer.

6. The display substrate according to claim 1, wherein the antenna layer further comprises a second antenna arranging region at least partially surrounded by the first antenna arranging region, the second antenna arranging region comprises a second antenna network, and the second antenna network comprises a plurality of second antenna lines insulated from the plurality of first antenna lines,
wherein at least a portion of the plurality of second antenna lines are electrically connected with the common electrode,
wherein at least a portion of the plurality of second antenna lines comprises an electrical connection part configured to be electrically connected with the common electrode,
a line width of the electrical connection part is larger than a line width of the second antenna line located at both sides of the electrical connection part.

7. The display substrate according to claim 6, wherein the plurality of second antenna lines include a third sub-line extending in a first direction, and the third sub-line has a first break to insulate line portions on both sides of the first break,
wherein the display substrate has a plurality of subpixels arranged in a plurality of rows and a plurality of columns,
the plurality of subpixels include a plurality of second subpixels overlapping with the second antenna arranging region in a direction perpendicular to the base substrate, and each two rows of the second subpixels are correspondingly provided with one first break,
wherein the first break and the second signal line at least partially overlap in a direction perpendicular to the base substrate.

8. The display substrate according to claim 7, wherein the plurality of second antenna lines include a fourth sub-line extending in a second direction, and the fourth sub-line has a second break to insulate the line portions on both sides of the second break, wherein every three or four second subpixels are correspondingly provided with one second break.

9. The display substrate according to claim 1, wherein the antenna layer further comprises a third antenna arranging region arranged at a side of the first antenna arranging region, the third antenna arranging region comprises a third antenna network, and the third antenna network comprises a plurality of third antenna lines insulated from the plurality of first antenna lines,
 wherein at least a portion of the plurality of third antenna lines are electrically connected with the common electrode.

10. The display substrate according to claim 1, wherein the display substrate has a display region and a peripheral region surrounding the display region, and the first antenna network is located at least in the display region,
 wherein the display substrate further comprises:
 an antenna binding part, arranged in the peripheral region and located at a first side of the display region, and at least a portion of the plurality of first antenna lines are bound to the antenna binding part.

11. The display substrate according to claim 10, wherein the antenna binding part comprises a first binding portion and a second binding portion spaced from each other, and the first binding portion and the second binding portion respectively comprise a plurality of binding pins,
 a first end of a whole of the first antenna network formed by a plurality of first antenna lines is bound to a plurality of binding pins of the first binding portion, and a second end is bound to a plurality of binding pins of the second binding portion, and the whole of the first antenna network forms a coil in the first antenna arranging region,
 wherein the plurality of binding pins are arranged in a same layer as the gate electrode and/or the first source-drain electrodes,
 wherein the first end and the second end are electrically connected with the plurality of binding pins of the first binding portion and the second binding portion through a plurality of connection lines, respectively,
 the plurality of connection lines are arranged in a same layer with the common electrode.

12. The display substrate according to claim 11, wherein the first antenna arranging region is in a U-shape, and both ends of the U-shape respectively include the first end and the second end,
 wherein the U-shape comprises a first U-shape and a second U-shape nested with each other, and the second U-shape surrounds the first U-shape,
 a plurality of first antenna lines located at an end of the first U-shape are electrically connected with a plurality of first antenna lines located at an end of the second U-shape.

13. The display substrate according to claim 12, wherein the U-shape includes a fold line part located between the first end and the second end,
 wherein a number of the first subpixels and a number of the second subpixels in a Nth row of subpixels are different from a number of the first subpixels and a number of the second subpixels in a N+1th row of subpixels at a position of the fold line part, respectively, N is a positive integer greater than or equal to 1.

14. The display substrate according to claim 1, wherein the common electrode comprises a plurality of sub-electrodes, and a whole of each of the plurality of sub-electrodes is in a block shape,
 the display substrate further comprises a plurality of touch control lines, the plurality of touch control lines are respectively electrically connected with the plurality of sub-electrodes and configured to provide touch control signals to the plurality of sub-electrodes in a touch control stage,
 wherein the plurality of touch control lines are further configured to provide display signals to the plurality of block-shaped sub-electrodes in a display stage,
 wherein the plurality of touch control lines and the first signal line are arranged in a same layer with the first source-drain electrode,
 wherein extending directions of the plurality of touch control lines are substantially a same with an extending direction of the first signal line.

15. The display substrate according to claim 14, wherein the plurality of touch control lines respectively comprise touch control connection parts configured to be electrically connected with the plurality of block-shaped sub-electrodes,
 the plurality of first sub-lines are disconnected at a position of the touch control connection part.

16. A display device, comprising:
 the display substrate according to claim 1;
 an opposite substrate, being opposite to the display substrate; and
 a liquid crystal layer, located between the display substrate and the opposite substrate.

17. The display device according to claim 16, wherein the opposite substrate comprises a black matrix layer, the black matrix layer includes a plurality of subpixel openings,
 orthographic projections of the plurality of first antenna lines on the base substrate are located inside an orthographic projection of the black matrix layer on the base substrate.

18. A method of manufacturing a display substrate, comprising:
 providing a base substrate,
 forming a pixel driving circuit layer on the base substrate, wherein the pixel driving circuit layer comprises a thin film transistor and a plurality of signal lines, and
 forming an antenna layer on a side of the pixel driving circuit layer far away from the base substrate, wherein the antenna layer comprises a first antenna arranging region, and the first antenna arranging region comprises a first antenna network formed by a plurality of first antenna lines;
 wherein in a direction perpendicular to the display substrate, at least a portion of the plurality of first antenna lines overlap with at least a portion of the plurality of signal lines,
 wherein the thin film transistor comprises a gate electrode, a first source-drain electrode and a second source-drain electrode,
 the plurality of signal lines include a first signal line electrically connected with the first source-drain electrode and extending substantially in a first direction, and the plurality of first antenna lines include a first sub-line extending substantially in the first direction, and
 in a direction perpendicular to the base substrate, the first signal line and the first sub-line at least partially overlap with each other,
 wherein a line width of the first sub-line is less than or equal to a line width of the first signal line,
 wherein the method of manufacturing the display substrate further comprises:
 forming a planarization layer on a side of the antenna layer far away from the base substrate to planarize the antenna layer, forming a pixel electrode layer on a side of the planarization layer far away from the base substrate and the pixel electrode layer comprising a pixel electrode, wherein the planarization layer comprises a pixel through hole, and the pixel electrode is electrically connected with the second source-drain electrode of the thin film transistor at least through the pixel through hole, wherein the method of manufacturing the display substrate further comprises:

forming a common electrode layer on a side of the pixel electrode layer far away from the base substrate and the common electrode layer being insulated from the pixel electrode layer and including a common electrode, wherein the common electrode comprises a bending part, in a direction perpendicular to the base substrate, the bending part at least partially overlaps with a second sub-line.

* * * * *